US007219239B1

(12) United States Patent
Njemanze et al.

(10) Patent No.: US 7,219,239 B1
(45) Date of Patent: May 15, 2007

(54) METHOD FOR BATCHING EVENTS FOR TRANSMISSION BY SOFTWARE AGENT

(75) Inventors: Hugh S. Njemanze, Los Altos, CA (US); Hector Aguilar-Macias, Sunnyvale, CA (US); Christian Friedrich Beedgen, San Jose, CA (US)

(73) Assignee: ArcSight, Inc., Cupertino, CA (US)

( * ) Notice: Subject to any disclaimer, the term of this patent is extended or adjusted under 35 U.S.C. 154(b) by 576 days.

(21) Appl. No.: 10/308,585

(22) Filed: Dec. 2, 2002

(51) Int. Cl.
*H04L 9/32* (2006.01)
*G06F 12/14* (2006.01)

(52) U.S. Cl. .................. 713/201; 726/21; 726/22; 726/23; 726/25

(58) Field of Classification Search .................. 726/22
See application file for complete search history.

(56) References Cited

U.S. PATENT DOCUMENTS

| | | | |
|---|---|---|---|
| 5,717,919 A | | 2/1998 | Kodavalla et al. |
| 6,192,034 B1 | | 2/2001 | Hsieh et al. |
| 6,279,113 B1 | * | 8/2001 | Vaidya ........................ 726/23 |
| 6,321,338 B1 | | 11/2001 | Porras et al. |
| 6,347,374 B1 | * | 2/2002 | Drake et al. ................... 726/1 |
| 6,484,203 B1 | | 11/2002 | Porras et al. |
| 6,578,147 B1 | * | 6/2003 | Shanklin et al. .............. 726/22 |
| 6,694,362 B1 | | 2/2004 | Secor et al. |
| 6,704,874 B1 | * | 3/2004 | Porras et al. ................. 726/22 |
| 6,708,212 B2 | | 3/2004 | Porras et al. |
| 6,711,615 B2 | | 3/2004 | Porras et al. |
| 6,775,657 B1 | * | 8/2004 | Baker ........................ 706/45 |
| 6,966,015 B2 | | 11/2005 | Steinberg et al. |
| 6,988,208 B2 | | 1/2006 | Hrabik et al. |
| 7,043,727 B2 | | 5/2006 | Bennett et al. |
| 2002/0099958 A1 | | 7/2002 | Hrabik et al. |
| 2003/0046582 A1 | * | 3/2003 | Black et al. ................ 713/201 |
| 2003/0093514 A1 | | 5/2003 | Valdes et al. |
| 2003/0093692 A1 | | 5/2003 | Porras |
| 2003/0101358 A1 | | 5/2003 | Porras et al. |

(Continued)

FOREIGN PATENT DOCUMENTS

WO    WO 2002/045315 A2    6/2002

(Continued)

OTHER PUBLICATIONS

IBM TDB; Chen, C; Kiser, JM. High Performance Multiple-Priority Event Queue in Object Oriented Analysis Implementation. Aug. 1, 1995. IBM Technical Disclosure Bulletin. vol. 38, No. 08. pp. 591-592.*
FIPS PUB 199, Federal Information Processing Standards Publication, "Standards for Security Categorization of Federal Information and Information Systems", U.S. Department of Commerce, Feb. 2004.
Table 1: Security Categorization of Federal Information and Information Systems (Revised Jul. 8, 2005) [online] [retrieved on Apr. 6, 2006] Retrieved from the internet <URL: http://irm.cit.nih.gov/security/table1.htm>.

(Continued)

*Primary Examiner*—Emmanuel L. Moise
*Assistant Examiner*—Jaric Loving
(74) *Attorney, Agent, or Firm*—Fenwick & West LLP

(57) ABSTRACT

In one embodiment, the present invention provides for receiving security events from a network device by a distributed software agent of a network security system, determining a priority of each received security event, and storing the security events in a plurality of prioritized event buffers based on the determined priorities for a period of time determined by a timer. Upon expiration of the timer, a batch of security events for transport to a security event manager of the network security system can be created by including security events in the batch in order of priority until the batch is full.

27 Claims, 15 Drawing Sheets

U.S. PATENT DOCUMENTS

| | | |
|---|---|---|
| 2004/0010718 A1 | 1/2004 | Porras et al. |
| 2004/0024864 A1 | 2/2004 | Porras et al. |
| 2004/0044912 A1 | 3/2004 | Connary et al. |
| 2004/0221191 A1 | 11/2004 | Porras et al. |
| 2005/0027845 A1 | 2/2005 | Secor et al. |
| 2005/0204404 A1 | 9/2005 | Hrabik et al. |
| 2006/0069956 A1 | 3/2006 | Steinberg et al. |

FOREIGN PATENT DOCUMENTS

| | | |
|---|---|---|
| WO | WO 02/060117 A1 | 8/2002 |
| WO | WO 2002/078262 A1 | 10/2002 |
| WO | WO 2002/101988 A2 | 12/2002 |
| WO | WO 2003/009531 A2 | 1/2003 |
| WO | WO 2004/019186 A2 | 3/2004 |

OTHER PUBLICATIONS

ARCSIGHT, "About ArcSight Team," date unknown, [online] [Retrieved on Oct. 25, 2002] Retrieved from the Internet <URL:http://www.arcsight.com/about_team.htm>.

ARCSIGHT, "ABout Overview," Oct. 14, 2002, [online] [Retrieved on Apr. 21, 2006] Retrieved from the Internet <URL: http://web.archive.org/web/20021014041614/http://www.arcsight.com/about.htm>.

ARCSIGHT, "Contact Info," date unknown, [online] [Retrieved on Oct. 25, 2002] Retrieved from the Internet <URL:http://www.arcsight.com.htm>.

ARCSIGHT, "Enterprise Coverage: Technology Architecture," date unknown, [online] Retrieved from the Internet <URL: http://www.snaiso.com/Documentation/Arcsight/arcsight_archdta.pdf>.

ARCSIGHT, "Managed Process: ArcSight Reporting System," data unknown, [online] *Retrieved from the Internet <URL: http://www.snaiso.com/Documentation/Arcsight/arcsight_reportsys.pdf>.*

ARCSIGHT, "Managed Process: Console-Based Management," date unknown, [online] Retrieved from the Internet <URL: http://www.snaiso.com/Documentation/Arcsight/arcsight_console.pdf>.

ARCSIGHT, "Precision Intelligence: SmartRules™ and Cross-Correlation," date unknown, [online] Retrieved from the Internet <URL: http://www.snaiso.com/Documentation/Arcsight/arcsight_correlation.pdf>.

ARCSIGHT, "Precision Intelligence: SmartAgent™," date unknown, [online] Retrieved from the Internet <URL: http://www.ossmanagement.com/SmartAgent.pdf>.

ARCSIGHT, "Product Info: Product Overview and Architecture," date unknown, [online] [Retrieved on Oct. 25, 2002] Retrieved from the Internet <URL: http://www.arcsight.com/product.htm>.

ARCSIGHT, "Product Info: 360° Intelligence Yields Precision Risk Management," date unknown, [online] [Retrieved on Oct. 25, 2002] Retrieved from the Internet <URL: http://www.arcsight.com/product_info.htm>.

ARCSIGHT, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.

ARCSIGHT, "Product Info: ArcSight Cross-Device Correlation," date unknown, [online] [Retrieved on Oct. 25, 2005] Retrieved from the Internet <URL: http://www.arcsight.com/product_info03.htm>.

ARCSIGHT, "Product Info: ArcSight Manager," date unknown, [online] [Retrieved on Oct. 25, 2002] Retrieved from the Internet <URL: http:www.arcsight.com/product_info04.htm>.

ARCSIGHT, "Product Info: ArcSight Console," date unknown, [online] [Retreived on Nov. 15, 2002] Retrieved from the Internet <URL: http:www.arcsight.com/product_info05.htm>.

ARCSIGHT, "Product Info: ArcSight Reporting System," date unknown, [online] [Retrieved on Oct. 25, 2002] Retrieved from the Internet <URL: http:www.arcsight.com/product_info06.htm>.

ARCSIGHT, "Product Info: Enterprise Scaling," date unknown, [online] [Retrieved on Oct. 25, 2002] Retrieved from the Internet <URL: http://www.arcsight.com/product_info07.htm>.

ARCSIGHT, "Security Management for the Enterprise," 2002, [online] [Retrieved on Oct. 25, 2002] Retrieved from the Internet <URL: http:www.arcsight.com/>.

ARCSIGHT, "Technical Brief: How Correlation Eliminates False Positives," date unknown, source unknown.

Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.

Derodeff, C. "Got Correlation? Not Without Normalization," 2002, [online] Retrieved from the Internet <URL:http://www.svic.com/papers/pdf/Got-Correlation_rmalization.pdf>.

Cheung, S. et al., "EMERALD Intrusion Incident Report: 601 Message Specification," Aug. 10, 2000, System Design Laboratory, SRI International.

Haley Enterprise, "Production Systems," 2002, [online] [Retrieved on Oct. 29, 2002] Retrieved from the Internet <URL: http://www.haley.com/0072567836705810/ProductionSystems.html>.

Haley Enterprise, "The Rete Algorithm," 2002, [online] [Retrieved on Oct. 29, 2002] Retrieved from the Internet <URL: http://www.haley.com/0072567836705810/ReteAlgorithm.html>.

Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "AINT Misbehaving: A Taxonomy of Anti-Intrusion Techniques," 2000, [online] [Retrieved on Nov. 1, 2002] Retrieved from the Internet <URL:http://www.sans.org/newlook/resources/IDFAQ/aint.htm>.

Lindqvist, U. et al., "Detacting Computer and Network Misuse Through the Production-Based Expert System Toolset (P-BEST)," Proceedings of the IEEE Symposium on Security and Privacy, Oakland, California, May 9-12, 1999.

CERT Coordination Center, "Overview of Attack Trends," 2002, [online] Retrieved from the internet <URL: http://www.cert.org/archive/pdf/attack_trends,pdf>.

Porras, P.A. et al., "EMERALD: Event Monitoring Enabling Responses to Anomalous Live Disturbances," Oct. 1997, Proceedings of the 20th NIST-NCSC National Information Systems Security (NISS) Conference.

Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.

Ingargiola, G., "The Rete Algorithm," date unknown, [online] [Retrieved on Oct. 29, 2002] Retrieved from the Internet <URL:http://yoda.cis.temple.edu:8080/UGAIWWW/lecture/rete.html>.

Bruneau, G., "What Difficulties are Associated on Matching Events with Attacks. Why Is Event/Data Correlation Important?," 2001, [online] [Retrieved on Nov. 1, 2002] Retrieved from the Internet <URL: http://www.sans.org/newlook/resources/IDFAQ/matching.htm>.

Wood, M., et al., "Internet-Draft: Intrusion Detection Message Exchange Requirements," Jun. 23, 2002, [online] [Retrieved on Nov. 1, 2002] Retrieved from the Internet <URL:http://www.silicondefense.com/idwg/draft-ieft-idwg-requirements-07.txt>.

U.S. Appl. No. 60/405,921, filed Aug. 26, 2002, Gisby et al.

Heberlein, L. T., et al., "A Method to Detect Intrusive Activity in a Networked Environment," Proceedings of the Fourteenth National Computer Security Conference, NIST/NCSC, Oct. 1-4, 1991, Washington D.C., pp. 362-371.

Javitz, H. S., et al., "The NIDES Statistical Component Description and Justification," SRI Project 3131, Contract N00039-92-C-0015, Annual Rport, A010, Mar. 7, 1994.

Jou, Y. F., et al., "Architecture Design of a Scalable Intrusion Detection System for the Emerging Network Infrastructure," MCNC, Technical Report CDRL A005, April 1997.

Porras, P. A., et al., "Live Traffic Analysis of TCP/IP Gateways," Symposium on Networks and Distributed Systems Security, Internet Society, March 1998.

Robinson, S. L., "Memorandum Opinion" in SRI International, Inc. v. Internet Security Systems, Inc. and Symantec Corporation (D. Del., Civ. No. 04-1199-SLR), Oct. 17, 2006.

Valdes, A., et al., "Statistical Methods for Computer Usage Anomaly Detection Using NIDES (Next-Generation Intrusion Detection Expert System)," Proceedings of the Third International Workshop on Rough Sets and Soft Computing (RSSC 94). Jan. 27, 1995, San Jose, CA, pp. 306-311.

* cited by examiner

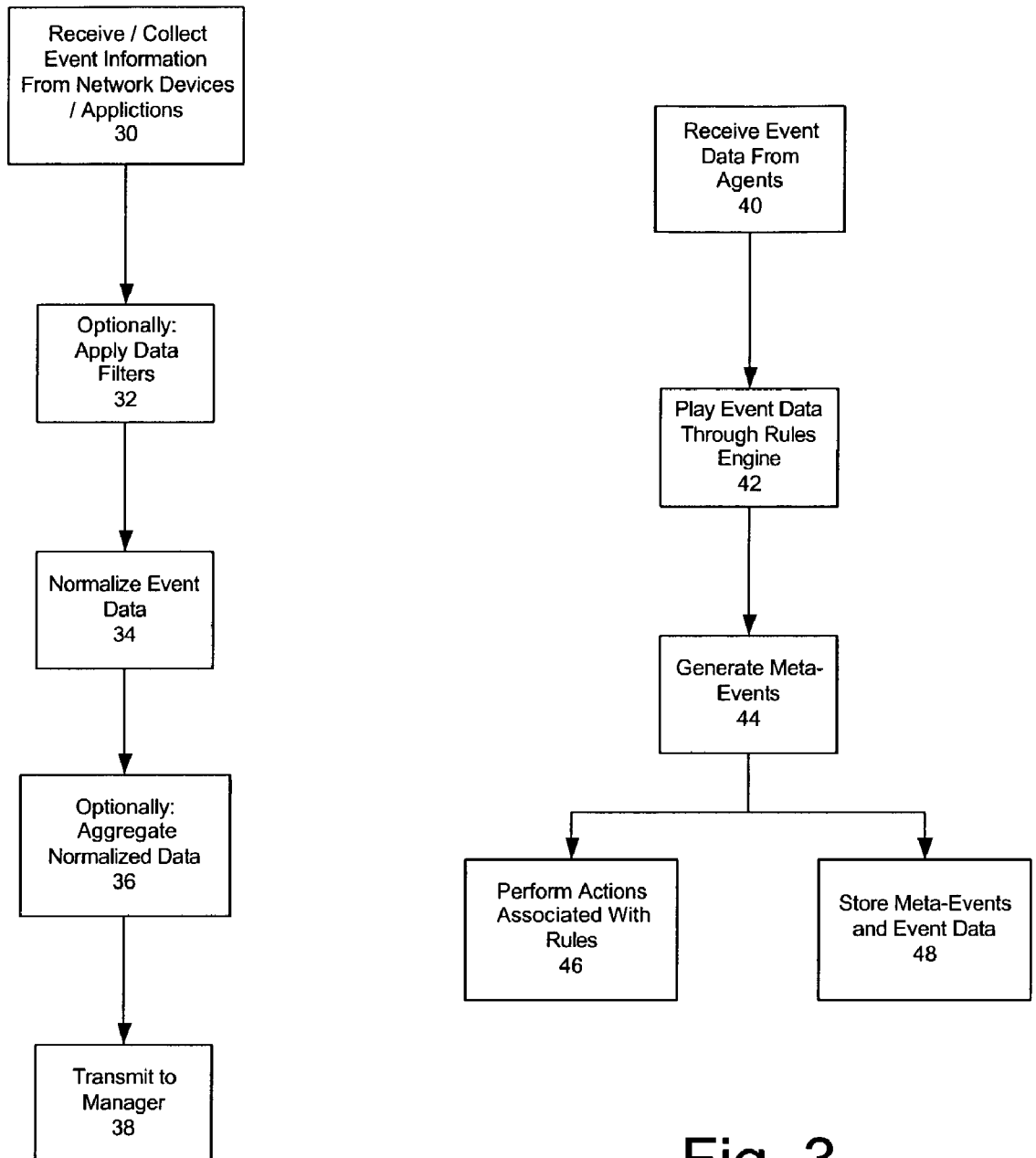

METHOD FOR BATCHING EVENTS FOR TRANSMISSION BY SOFTWARE AGENT

FIELD OF THE INVENTION

The present invention relates to a computer-based system for capturing security events and batching such events prior to reporting the events using software agents.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, intrusion detection systems (IDS) have been developed to help uncover attempts by unauthorized persons and/or devices to gain access to computer networks and the information stored therein.

Intrusion detection may be regarded as the art of detecting inappropriate, incorrect or anomalous activity within or concerning a computer network or system. The most common approaches to intrusion detection are statistical anomaly detection and pattern-matching detection. IDS that operate on a host to detect malicious activity on that host are called host-based IDS (and may exist in the form of host wrappers/personal firewalls or agent-based software), and those that operate on network data flows are called network-based IDS. Host-based intrusion detection involves loading software on the system (the host) to be monitored and using log files and/or the host's auditing agents as sources of data. In contrast, a network-based intrusion detection system monitors the traffic on its network segment and uses that traffic as a data source. Packets captured by the network interface cards are considered to be of interest if they match a signature.

Regardless of the data source, there are two complementary approaches to detecting intrusions: knowledge-based approaches and behavior-based approaches. Almost all IDS tools in use today are knowledge-based. Knowledge-based intrusion detection techniques involve comparing the captured data to information regarding known techniques to exploit vulnerabilities. When a match is detected, an alarm is triggered. Behavior-based intrusion detection techniques, on the other hand, attempt to spot intrusions by observing deviations from normal or expected behaviors of the system or the users (models of which are extracted from reference information collected by various means). When a suspected deviation is observed, an alarm is generated.

Advantages of the knowledge-based approaches are that they have the potential for very low false alarm rates, and the contextual analysis proposed by the intrusion detection system is detailed, making it easier for a security officer using such an intrusion detection system to take preventive or corrective action. Drawbacks include the difficulty in gathering the required information on the known attacks and keeping it up to date with new vulnerabilities and environments.

Advantages of behavior-based approaches are that they can detect attempts to exploit new and unforeseen vulnerabilities. They are also less dependent on system specifics. However, the high false alarm rate is generally cited as a significant drawback of these techniques and because behaviors can change over time, the incidence of such false alarms can increase.

Regardless of whether a host-based or a network-based implementation is adopted and whether that implementation is knowledge-based or behavior-based, an intrusion detection system is only as useful as its ability to discriminate between normal system usage and true intrusions (accompanied by appropriate alerts). If intrusions can be detected and the appropriate personnel notified in a prompt fashion, measures can be taken to avoid compromises to the protected system. Otherwise such safeguarding cannot be provided. Accordingly, what is needed is a system that can provide accurate and timely intrusion detection and alert generation so as to effectively combat attempts to compromise a computer network or system.

SUMMARY OF THE INVENTION

In one embodiment, the present invention provides for receiving security events from a network device by a distributed software agent of a network security system, determining a priority of each received security event, and storing the security events in a plurality of prioritized event buffers based on the determined priorities for a period of time determined by a timer. Upon expiration of the timer, a batch of security events for transport to a security event manager of the network security system can be created by including security events in the batch in order of priority until the batch is full.

BRIEF DESCRIPTION OF THE DRAWINGS

The present invention is illustrated by way of example, and not limitation, in the figures of the accompanying drawings in which:

FIG. 2 illustrates procedures followed by an agent configured in accordance with an embodiment of the present invention when collecting, normalizing and reporting security event data;

FIG. 3 illustrates procedures followed by a manager configured in accordance with an embodiment of the present invention when analysing security event data and generating alerts based thereon;

DETAILED DESCRIPTION

Figure 1:
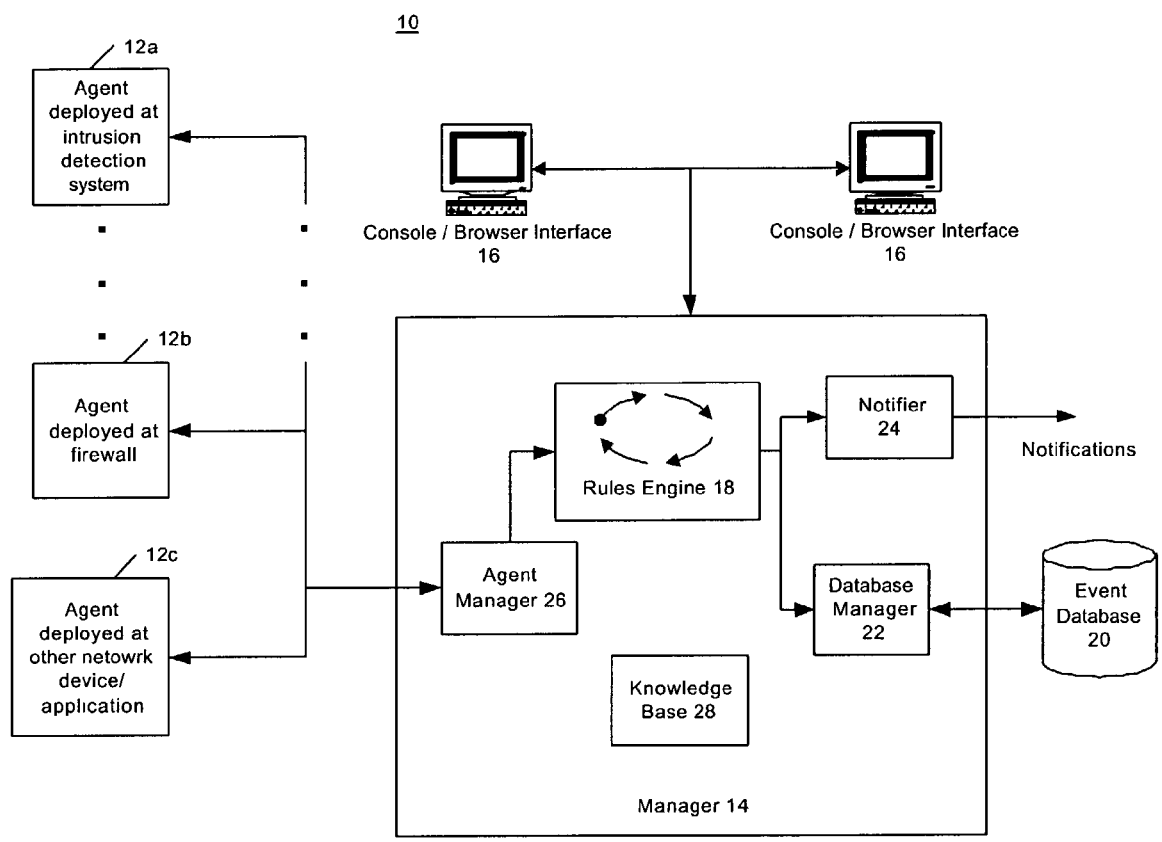
FIG. 1 illustrates one embodiment of a computer-based system for capturing, normalizing and reporting security events from heterogeneous sources configured in accordance with the present invention.

Described herein is a computer-based system for capturing security events from heterogeneous sources, normalizing such events to a common schema and cross-correlating such normalized events with rules to create meta-events. The system (one embodiment of which is manifest as computer software, enables aggregation, correlation, detection, and investigative tracking of suspicious network activities from multiple security devices. The present system also supports response management, ad-hoc query resolution, reporting and replay for forensics analysis, and graphical visualization of network threats and activity.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a computer-based system 10 architected in accordance with an embodiment of the present invention is illustrated. System 10 includes agents 12, one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network elements including firewalls, intrusion detection systems and operating system logs. Agents 12 can collect events from any source that produces event logs or messages and can operate at the native device, at consolidation points within the network, and/or through simple network management protocol (SNMP) traps.

Managers 14 are server-based components that further consolidate; filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes an Oracle™ database. Communications between manager 14 and agents 12 may be bi-directional (e.g., to allow manager 14 to transmit commands to the platforms hosting agents 12) and encrypted. In some installations, managers 14 may act as concentrators for multiple agents 12 and can forward information to other managers (e.g., deployed at a corporate headquarters).

Consoles 16 are computer- (e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal computer (which takes the place of console 16) to provide some or all of the functionality of a console 16. Browser access is particularly useful for security professionals that are away from the consoles 16 and for part-time users. Communication between consoles 16 and manager 12 is bi-directional and may be encrypted.

Through the above-described architecture the present invention can support a centralized or decentralized environment. This is useful because an organization may want to implement a single instance of system 10 and use an access control list to partition users. Alternatively, the organization may choose to deploy separate systems 10 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. Systems 10 can also be deployed in a corporate hierarchy where business divisions work separately and support a rollup to a centralized management function.

Examining each of the various components in further detail, we begin with the agents 12. Agents 12 are used to collect, reduce and normalize the enormous amount of data that is generated by a network's security devices before a manager 14 acts on the data. As will become evident, this process goes beyond simple log consolidation. Before presenting those details, however, and to understand why such measures are desirable, some background regarding how analysts currently cope with security event information generated by multiple network devices is useful.

Conventional intrusion detection systems can help an analyst detect an attack directed at a network resource such as a server. Usually, such investigations are launched in response to an alert generated by the IDS. As a first step after receiving such an alert, an analyst might review perimeter router logs to see if a router associated with the network passed a packet that triggered the alert. If such a packet were discovered, the analyst would likely then want to review one or more firewall logs to see if any existing filters blocked the suspect packet. Assume, for the sake of this example, the suspect packet got past any firewalls; further investigation would be necessary to determine whether the integrity of server itself was compromised. Such an integrity check may be performed using a conventional software application such as Tripwire, which is a file integrity checker employing MD5 checksums, to see which files, if any, had been accessed or modified. Finally, the analyst may have to examine a Syslog or an EventLog from the subject server, as well as any tcpdump data collected by a dedicated tcpdump host, for the segment of time surrounding the attack to determine what actually happened.

By this time the analyst has accessed many different systems and looked at several different types of logs in an effort to distil a comprehensive view of the attack. This can be a significant amount of work, and time taken in such review and analysis is time lost from the vitally important tasks of securing the network and restoring the compromised server to make sure that no other systems will be affected. The present invention helps to minimize the time spent on such analysis by consolidating all the relevant information in a single logging facility, allowing the analyst to look at the data in whatever sequence or depth he or she requires.

More than just consolidation, though, the present agents 12 provide data normalization, which is of great benefit when an analyst must deal with security incidents in a heterogeneous network environment. To understand why normalization is helpful consider a typical enterprise environment, which consists of many different types of network devices ranging from border routers and VPN devices, to firewalls and authentication servers, and a wide range of application servers such as web servers, e-mail servers and database servers. Each of these devices generates logs that, as described above, are sources of data to a security analyst. However, it is seldom, if ever, the case that two manufactures will use the same event logging mechanism or format their event logs identically. For example a Cisco Systems PIX™ firewall will not report an accepted packet in the same way as a Check Point firewall or even in the same fashion as a Cisco Systems router.

An example of the types of various reports that might be generated by different network devices is presented below in Table 1, which shows examples of logs from different network devices, each reporting the same packet travelling across a network. In particular, these logs represent a remote printer buffer overflow that connects to IIS servers over port 80.

TABLE 1

Examples of Event Logs for Different Network Devices.

| Network Device | Event Log |
| --- | --- |
| Check Point firewall | "14" "21Dec2001" "12:10:29" "eth-s1p4c0" "ip.of.firewall" "log" "accept" "www-http" ""65.65.65.65" "10.10.10.10" "tcp" "4" "1355"""""""""""""""""""""""""""""firewall" "len 68" |
| Cisco Systems router | Dec 21 12:10:27: %SEC-6-IPACCESSLOGP: list 102 permitted tcp 65.65.65.65(1355) -> 10.10.10.10(80), 1 packet |
| Cisco Systems PIX firewall | Dec 21 2001 12:10:28: %PIX-6-302001: Built inbound TCP connection 125891 for faddr 65.65.65.65/1355 gaddr 10.10.10.10/80 laddr 10.0.111.22/80 |
| Snort | [] [1:971:1] WEB-IIS ISAPI .printer access [] [Classification: Attempted Information Leak] [Priority: 3] 12/21-12:10:29.100000 65.65.65.65:1355 -> 10.10.10.10:80 TCP TTL:63 TOS:0x0 ID:5752 IpLen:20 DgmLen:1234 DF *AP* Seq: 0xB13810DC Ack: 0xC5D2E066 Win: 0x7D78 TcpLen: 32 TCP Options (3) => NOP NOP TS: 493412860 0 [Xref => http://cve.mitre.org/cgi-bin/cvename.cgi?name=CAN-2001-0241] [Xref => http://www.whitehats.com/info/IDS533] |

The Check Point record contains the following fields: event id, date, time, firewall interface, IP address of the firewall interface, logging facility, action, service, source IP, target IP, protocol, source port, some Check Point specific fields and then the size of the datagram. This report is, to say the least, difficult for a human analyst to read (especially with all the empty fields that are represented by double quotes). The Cisco router has a different format: date, time, logging facility, event name, source IP, source port, target address, target port, and number of packets. The Cisco PIX firewall, which is produced by the same manufacturer as the router, uses yet another format: date, time, event name, source IP, source port, translated address or target address, target port, local address, and local port.

The final record is a Snort alert that claims this traffic was malicious. Snort is a well-known IDS and the fields it populates are: exploit or event name, classification, priority, date, time, source IP, source port, target IP, target port, protocol, TTL (time to live), type of service, ID, IP length, datagram length, tcp flags, sequence number, acknowledgement number, window size, and tcp length. Snort also reports additional data such as references to investigate the exploit.

Agents 12 may be deployed in connection with some or all of these (and other) network components and applications. For example, in FIG. 1, agent 12a is deployed in connection with an IDS (such as Snort). Agent 12b is deployed in connection with a firewall (such as the Check Point firewall and/or the Cisco PIX firewall). Agent 12c is deployed in connection with other network components or agents (e.g., a router). Each of these agents receives the event information from its associated network device or application in that device's or application's native format and converts (or normalizes) the information to a common schema. This normalization allows for later storage of the event information in a format that can more readily be utilized by an analyst.

Many normalized schemas can be used and, in general, choosing the fields of a common schema may be based on content rather than semantic differences between device logs and/or manufacturers. To accomplish this normalization, agents 12 are equipped with a parser configured to extract values from the events as reported by the individual network devices/applications and populate the corresponding fields in the normalized schema. Table 2 is an example of a normalized schema for the data reported by the devices in Table 1.

as reported by the firewall gets translated into "port 80" when the agent 12 reports the event to the manager 14.

Similarly, the agents 12 may need to be configured to convert the date/time stamp formats used by the various network devices/applications into a common date/time representation. That is, because the different network devices/applications all use different date/time formats, the agents cannot simply report the date/time stamps reported by the device/application. Instead, the agents 12 may be configured to convert local date/time stamps to a universal date/time notation, such as Greenwich Mean Time.

In addition to normalizing event data by fields, agents 12 can parse the event data stream and set field values based on conventions and practices of the organization. For example, the variety of event severity levels that devices produce can all be normalized at the agent level into a single, consistent hierarchy.

Thus, agents 12 collect and process events generated by heterogeneous network devices/applications throughout an enterprise. Alerts can come from routers, e-mail logs, anti-virus products, firewalls, intrusion detection systems, access control servers, VPN systems, NT Event Logs, Syslogs, and other sources where security threat information is detected and reported. In some embodiments, each event generator has an agent 12 assigned to collect all relevant security information, while in other embodiments agents are shared among two or more event generators. Thus, depending on the device/application to be monitored and the in-place infrastructure, a choice is provided for simple log parsing and loading, network listening (e.g., through SNMP traps),

TABLE 2

Common Schema Representation of Event Data

| Date | Time | Event Name | Src_IP | Src_Port | Tgt_IP | Trg_Port | Device Type | Additional data |
|---|---|---|---|---|---|---|---|---|
| 21 Dec. 2001 | 12:10:29 | accept | 65.65.65.65 | 1355 | 10.10.10.10 | 80 | Check Point | |
| 21 Dec. 2001 | 12:10:27 | list 102 permitted tcp | 65.65.65.65 | 1355 | 10.10.10.10 | 80 | Cisco Router | |
| 21 Dec. 2001 | 12:10:28 | built inbound tcp connection | 65.65.65.65 | 1355 | 10.10.10.10 | 80 | Cisco PIX | |
| 21 Dec. 2001 | 12:10:29 | WEB-IIS ISAPI .printer access | 65.65.65.65 | 1355 | 10.10.10.10 | 80 | Snort | TCP TTL: 63 TOS: 0x0 ID: 5752 IpLen: 20 DgmLen: 1234 DF*AP* Seq: 0xB13810DC Ack: 0xC5D2E066 Win: 0x7D78 TcpLen: 32 TCP Options (3) => NOP NOP TS: 493412860 0 |

Table 2 reports the same four events described earlier, this time in a normalized fashion. Each of the agents 12 is configured to extract the relevant data from events reported by its associated network device/application and map that data to the corresponding common schema representation. For instance the Check Point firewall reports a target port as www-http, not as port 80 as is the case for most other network devices. Therefore an agent 12 associated with the Check Point firewall is configured with an appropriate lookup mechanism (e.g., a table) to ensure that "www-http"

installation on aggregation points (Syslog servers and concentrators) and full distribution to all security-relevant devices.

In addition to collecting and normalizing data from security devices, the agents 12 intelligently manage the data with:

Filtering: each agent 12 can be configured according to conditions by which data will be collected and sent to the manager 14. This helps to reduce the need to collect and manage large volumes of unwanted data.

Aggregation: Based on the time period selected, the agents 12 can collect duplicate alerts but send only a single message with a count of the total number of such alerts to the manager 14. This helps reduce the amount of traffic transmitted across the network.

Batching: Agents 12 can be configured to send a collection of alerts at one time rather than sending alerts immediately after each occurrence.

FIG. 2 illustrates the various processes performed by agents 12 from the point of view of the event information. Initially, at step 30, the raw event information is received or collected from the native network device or application in that device's/application's native format. At this point (or, optionally, following normalization), data filters may be applied to reduce the volume of data being passed for further analysis (step 32). Such filtering is optional and may involve assessing the captured data against one or more conditions to determine whether or not the data is relevant for further analysis.

Thereafter, the event data is normalized at step 34. As indicated above, the normalization may occur at the field and/or the field value level. Further, the normalization may involve translation of the field values into nomenclatures/formats used across an enterprise.

Following normalization, the event data may, optionally, be aggregated (step 36) before being transmitted to the manager 14 (step 38). The transmissions may occur s the events are captured or may be made on a batched basis. In either case, the messages used to transmit the event data preferably include all of the source fields of an event. By delivering the entire event data set (i.e., all of the source fields) organized in a consistent format (i.e., the common schema), powerful upstream data management, cross-correlation, display and reporting is available to the security team. In some embodiments the event data is discarded after successful transmission to the manager 14, but in other cases the data may be cached for a time at the agent 12 to permit later replay of the data.

Referring again to FIG. 1, the manager 14 includes one or more agent managers 26, which are responsible for receiving the event data messages transmitted by the agents 12. Where bi-directional communication with the agents 12 is implemented, these agent managers 26 may be used to transmit messages to the agents 12. If encryption is employed for agent manager communications (which is optional), the agent manager 26 is responsible for decrypting the messages received from agents 12 and encrypting any messages transmitted to the agents 12.

Once the event data messages have been received (and if necessary decrypted), the event data is passed to the rules engine 18. Rules engine 18 is at the heart of the manager 14 and is used to cross-correlate the event data with security rules in order to generate meta-events. Meta-events, in the context of the present invention, are instances of (usually) multiple individual event data elements (gathered from heterogeneous sources) that collectively satisfy one or more rule conditions such that an action is triggered. Stated differently, the meta-events represent information gathered from different sensors and presented as correlated results (i.e., the decision output of the rules engine 18 indicating that different events from different sources are associated with a common incident as defined by one or more rules).

The actions triggered by the rules may include notifications transmitted (e.g., via notifier 24) to designated destinations (e.g., security analysts may be notified via the consoles 16, e-mail messages, a call to a telephone, cellular telephone, voicemail box and/or pager number or address, or by way of a message to another communication device and/or address such as a facsimile machine, etc.) and/or instructions to network devices (e.g., via agents 12 or via external scripts or programs to which the notifier 24 may pass arguments) to take action to thwart a suspected attack (e.g., by reconfiguring one or more of the network devices, and or modifying or updating access lists, etc.). The information sent with the notification can be configured to include the most relevant data based on the event that occurred and the requirements of the analyst. In some embodiments, unacknowledged notifications will result in automatic retransmission of the notification to another designated operator.

As discussed below, when meta-events are generated by the rules engine 18, on-screen notifications may be provided to consoles 16 to prompt users to open cases for investigation of the events which led to the notification. This may include accessing knowledge base 28 to gather information regarding similar attack profiles and/or to take action in accordance with specified procedures. The knowledge base 28 contains reference documents (e.g., in the form of web pages and/or downloadable documents) that provide a description of the threat, recommended solutions, reference information, company procedures and/or links to additional resources. Indeed, any information can be provided through the knowledge base 28. By way of example, these pages/documents can have as their source: user-authored articles, third-party articles, and/or security vendors' reference material.

The rules engine 18 is based on a RETE engine configured to preserve event information state over configurable time windows so as to provide correlation of the event data according to specified rules. Correlation is generally regarded as a process of bringing information items into mutual relation. In the context of the present invention, correlation through rules engine 18 provides the ability to access, analyze, and relate different attributes of events from multiple sources to bring something to the attention of an analyst that might (or likely would) have otherwise gone unnoticed. In other words, the rules engine 18 provides the ability to determine what type of incident is represented by a collection of events reported by a number of heterogeneous network devices and/or applications. Because the collected event data is normalized into a common event schema, correlation can be performed utilizing any field including, but not limited to, geography, device type, source, target, time thresholds, and/or event type. Based on alerts generated by the rules engine 18, operators are provided with a workflow for investigating these incidents.

Turning to FIG. 3, the manager 14 receives (step 40) and analyzes (step 42) the event data reported by agents 12 in real-time (or near real-time owing to network latencies and depending upon whether or not batched message transmission is used) according to a set of flexible rules. The rules define which events generate an alert, when those events generate an alert, and what actions are associated with the alert. Hence, the rules may be written to contain event conditions, thresholds, and actions. In some embodiments the rule conditions may be specified using Boolean operators and/or database queries. When incoming events match a particular rule's conditions and thresholds, causing a meta-event to be generated (step 44), the rule automatically fires the action that has been defined (step 46). Such actions can include, but are not limited to: executing a pre-determined command or script, logging the alert, sending the alert to the consoles 16, sending the alert to notification designees, setting custom severity levels for the alert based on cumulative activity, adding a source to a suspicious list or a target to a vulnerable list, and/or a combination of these actions.

Rules may be created at the manager 14 and/or at the consoles 16 using a flexible scripting language. An example of a rule might be:

If (an ids evasion attack) occurs (from the same source ip address) (3 times) within (2 minutes) then (send message to console) and (notify the security supervisor via pager).

In this example, the incoming event data would be compared against the rule conditions and thresholds (in the above example 3 events that satisfy the condition of an IDS evasion attack are required and all must originate from a common source IP address and be detected within 2 minutes of each other), and if those criteria are satisfied the designated actions (here, sending an alert message to the consoles 16 and also notifying a security supervisor via a pager) would be performed. The correlation rules that operate on the events evaluate threats and attacks according to selected criteria (e.g., degree of threat, level of success, vulnerability of target and value of target) and generate alerts according to a security intelligence taxonomy that focuses attention on the most dangerous and potentially most damaging attacks. For example, threats to network assets that are deemed not to have succeeded or that are not likely to succeed may be coded green, while those that have succeeded or have a high probability of success might be coded red. The value of the security information taxonomy lies in its ability to eliminate false positives while clearly identifying real threats to vulnerable and valuable assets.

In general, the rules may be designed to capture threats and attacks that are typical in large, diverse networks and may be organized to provide multiple lines of defense by detecting specific activities and grouping them according to level of threat:

Reconnaissance zone transfer, port scan, protocol, scanning, etc.

Suspicious illegal outgoing traffic, unusual levels of alerts from the same host, etc.

Attack overflow, IDS evasion, virus, denial of service, etc.

Successful compromise of a backdoor, root compromise, covert channel exploit, etc.

Similar events and signatures may be grouped into rule categories that can be utilized by the rules to insulate the rule from changes in vendor-specific event details. For example, event names may change between product releases or new devices may be added to the network infrastructure with a new set of nomenclature. Since the rule categories map similar signatures into a single name that is used by the rules engine, if an individual network device changes taxonomy, only the mapping is changed, not the rule definition. Therefore, despite changes in individual devices, the investment in custom defined rules is preserved.

After the events are processed by rules engine 18, the raw event data as well as any meta-events that were generated are stored in database 20 (step 48). In some embodiments, the raw event data may be stored prior to or concurrently with processing of the data by rules engine 18. Regardless of the sequence, such storage of the event data (and the meta events generated by the rules engine 18) preserves a historical record of the event traffic and allows for replaying of the events through an existing or a new rule set (either at the manager 14 or the consoles 16) in order to assess the efficacy of new rules, for training purposes, and/or for case investigation.

Correlation via the rules ensures that credible threats and attacks come to the attention of the security staff on a high-priority basis. Hence once an alert is received, the operator can perform in-depth analysis and take aggressive action secure in the knowledge that the effort is well spent. When a rule match is reported to a console 16, the analyst can quickly drill down (through an associated graphical user interface) to see all of the individual events that caused the rule to fire. If necessary, the analyst can investigate even further to see all of the individual data elements captured for those events.

When action is required, the present invention provides a full set of tools and services for the operator. Resources such as the rule definition, a knowledge base article containing company policies and recommended actions, and the development of a complete case docket describing the problem assist the operator in responding immediately to critical security threats. If necessary, the operator can proactively deal with an attack by launching specific applications or scripts from the console 16 to reconfigure device settings or change access privileges.

The console 16 provides a centralized view into the security status of an enterprise and gives administrators, analysts, and operators an interface to perform security management tasks. In various embodiments, the console provides event display in real-time or in replay mode (i.e., the ability to playback events from a given time period according to a VCR or DVD metaphor). Replay may be had from the events stored in database 20 or, in some instances, from caches associated with agents 12. This latter form of replay is especially useful because it provides improved simulation of actual network conditions as the events are played out across the same network as during the original attack.

Consoles 16 also provide operators with complete drill-down capability from the highest level of detail (e.g., the entire rage of events) to the lowest level of detail (e.g., fields within a single event). This allows analysts to probe at whatever level of detail is required to gain further insight into an attack and assess vulnerability. This varying level of detailed analysis is made possible because the agents 12 report all of the event data fields, not merely a subset thereof. By way of example, one tool provides analysts with the ability to quickly see similar characteristics of events using a cursor control operation, such as a mouse click. For example, if analysts are presented with a meta-event alert that consists of, say, twenty or more individual events reported by several different agents associated with different network devices, the present user interface associated with consoles 16 allows the analyst to quickly visualize only the common fields of these events (e.g., such as a source IP address) by simply highlighting the events and performing a mouse click/select operation.

Once security personnel have been notified of a meta-event, they can utilize the knowledge base to determine the appropriate actions. In addition, security analysts may undertake investigations of events and/or meta-events. In general, such matters can be assigned to so-called cases. Stated differently, cases create a workflow and oversight environment for situations where there are suspicious events requiring further investigation. Once a case is created, it can be assigned to an operator, investigated, and resolved based on the business policies and practices of the enterprise (e.g., as documented in knowledge base 28). The security staff can also add narration and event information to a case, or view open cases to determine their status and any required next steps.

Consoles 16 also provide a front-end for the administration of the entire system 10. This may include system configuration such as setting up operators, notification, agent behavior, etc. User management, such as creating and modifying users, access, roles, and responsibilities), rules management (e.g., authoring, viewing, and updating rules), and workflow management (e.g., setting up the flow of actions taken when an event is received) may also be handled through the consoles 16. Finally, the consoles 16 allow for remote access, thus supporting divisional responsibility and "follow-the-sun" management.

Figure 4:
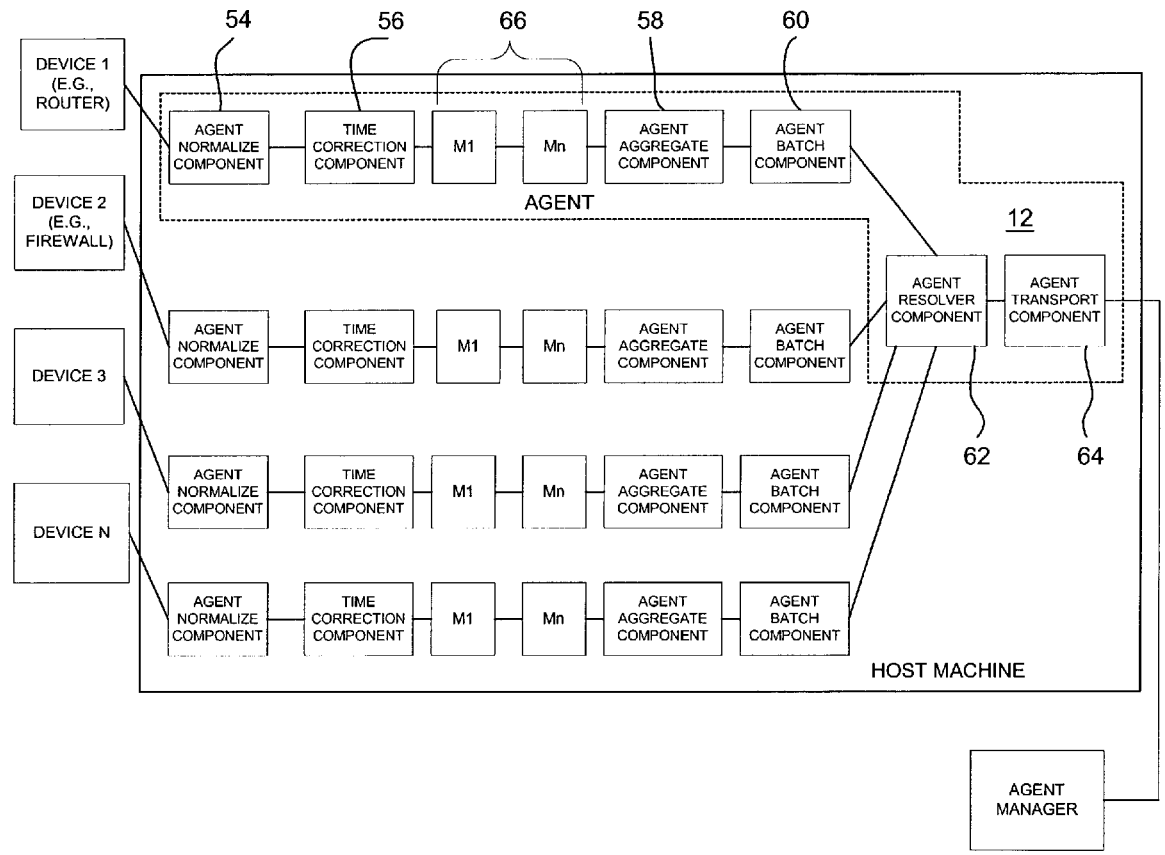
FIG. 4 illustrates an agent in accordance with an embodiment of the present invention within a host machine.
Figure 5:
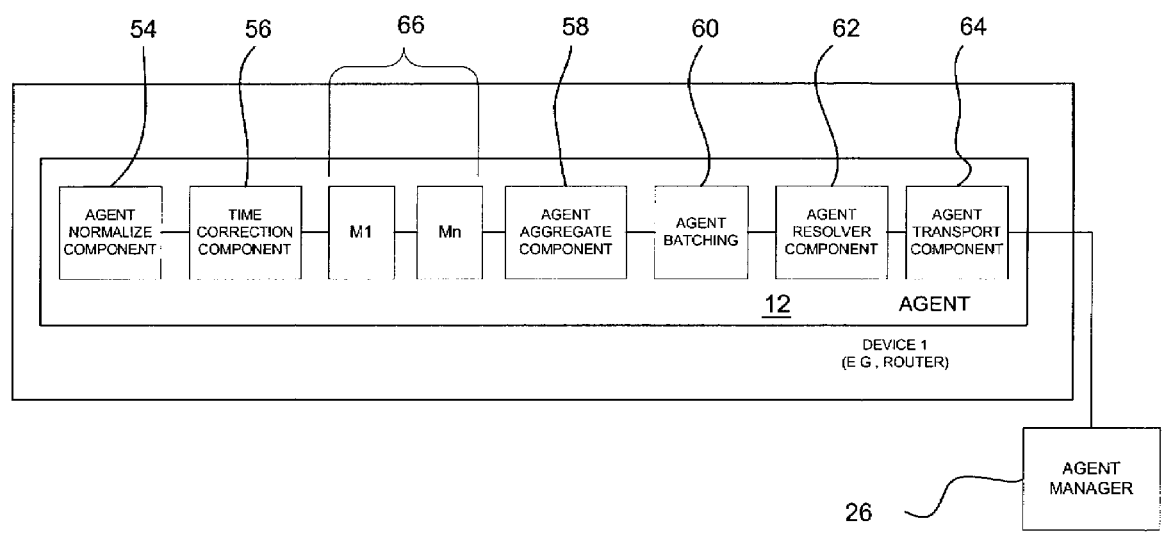
FIG. 5 illustrates a single agent in accordance with an embodiment of the present invention within a host machine.

The agents 12 described above are configurable by either manual process or via automatic processing. FIG. 4 illustrates the integration of multiple agents 12 within a host machine. FIG. 5 illustrates the integration of an agent 12 within a device (e.g., router). In the exemplary embodiment, the agent 12 may include a combination of components. The components are software modules developed using techniques and programming languages well known in the art. In one embodiment, the agent 12 includes an agent normalize component 54, a time correction component 56, an agent aggregate component 58, an agent batch component 60, an agent resolver component 62, an agent transport component 64, and multiple additional components 66. Use of any or all of these components is optional in any given implementation. Referring to FIG. 4, the agent resolver component 62 and agent transport component 64 may be shared by multiple agents within a host machine.

Associated with each agent 12 is a corresponding configuration file. In the exemplary embodiment the configuration file is a text file in which each line is an instruction to include a component (e.g., agent aggregate component 58) within an agent 12. It is through updating the instructions within the configuration file that agent 12 achieves modularity. In the exemplary embodiment an instruction may be added, deleted, or modified.

Moreover, the agent 12 is not limited to the components described above. In promoting the scalability and flexibility of the agent 12, additional components 66 may be created and included within the agent in future releases or according to customer requests/needs. As explained above the agent 12 may be configured manually. Thus, depending on the customers needs the agent 12 may be configured through manual entries by a user (e.g., via console/browser interface 16) or through an automated process. Such manual configuration may include merely modifying a configuration. In one embodiment, the configuration file is an ascii text file. Automated updates may include running a script file or any other technique well known in the art to update one or multiple agents. Moreover, the agent manager 26 may automatically update agents 12 based on analysis supported by the rules engine 18 and knowledge base 28.

The following is a description of each component named above:

Agent Normalize Component

Figure 6:
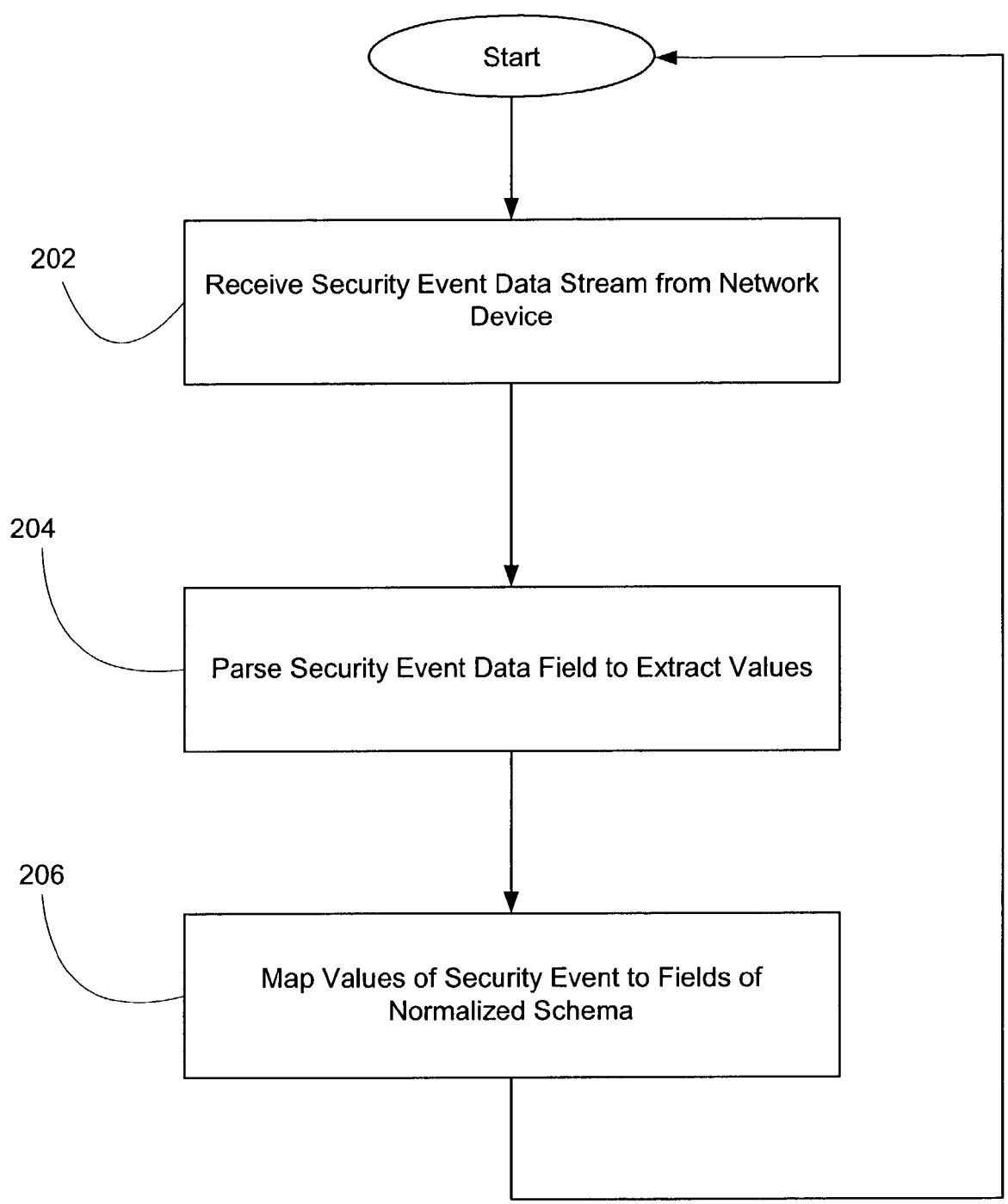
FIG. 6 is a flowchart illustrating a method, according to one embodiment of the invention, of security event normalization.

In one embodiment of the present invention, security events are first processed by the agent normalize component 54. The operation of the agent normalize component 54 is described with reference to FIG. 6. At block 202, the agent normalize component 54 receives the security event from the network device being monitored. This can involve the network device directly reporting the security event to the agent normalize component 54, the agent normalize component 54 accessing some shared memory space, or the agent normalize component 54 gaining access to the security event in any other channelized fashion.

The security event, as received, is an event data stream characterized by several values that need to be parsed and extracted. The data steam and the values contained therein are in the format of the network device that generated the event. Some example data streams are given above for an example event as reported by a Check Point firewall, a Cisco Systems router, a Cisco Systems PIX firewall, and the Snort IDS.

In block 204, the agent normalize component 54 parses the received event data stream for the values. The parser is configured to be able to determine the type of event from the data field and to extract and interpret the values based on this determination. That is, the parser is configured to interpret the syntax, semantics, type, and format of the reported event to extract the values.

In one embodiment, the parser is implemented using a descriptor file that is declaratively configurable. That is, the descriptor file contains declarative statements, such as Regular Expressions, that are interpreted as a high-level language. The descriptor file contains all possible formats for security events reported by the monitored network device. Thus, the received event data stream can be matched to the possible event types, and the key values can be extracted and interpreted to create a parsed event that is organized by values. Such a parser is configurable without programming language coding, thus improving the flexibility of the agents. An example of the parser using Regular Expressions (Regex) is given in Appendix C.

The extracted values are then used to populate the fields of the normalized schema. The schema population is done at block 206, where the Agent normalize component 54 maps the extracted values to various fields of the normalized schema to create a normalized event that the system can use to correlate with other normalized events from heterogeneous network devices. In one embodiment, the mapping is content based, rather than semantic based, to increase the efficiency of the normalized schema and to aid in correlating the heterogeneous events. For example, in the demonstration of Table 2 above, no matter where or in what format the value for the target port appeared in the event log, the value was always mapped to the Tgt_Port field of the normalized schema because all the values had the same content.

Figure 7:
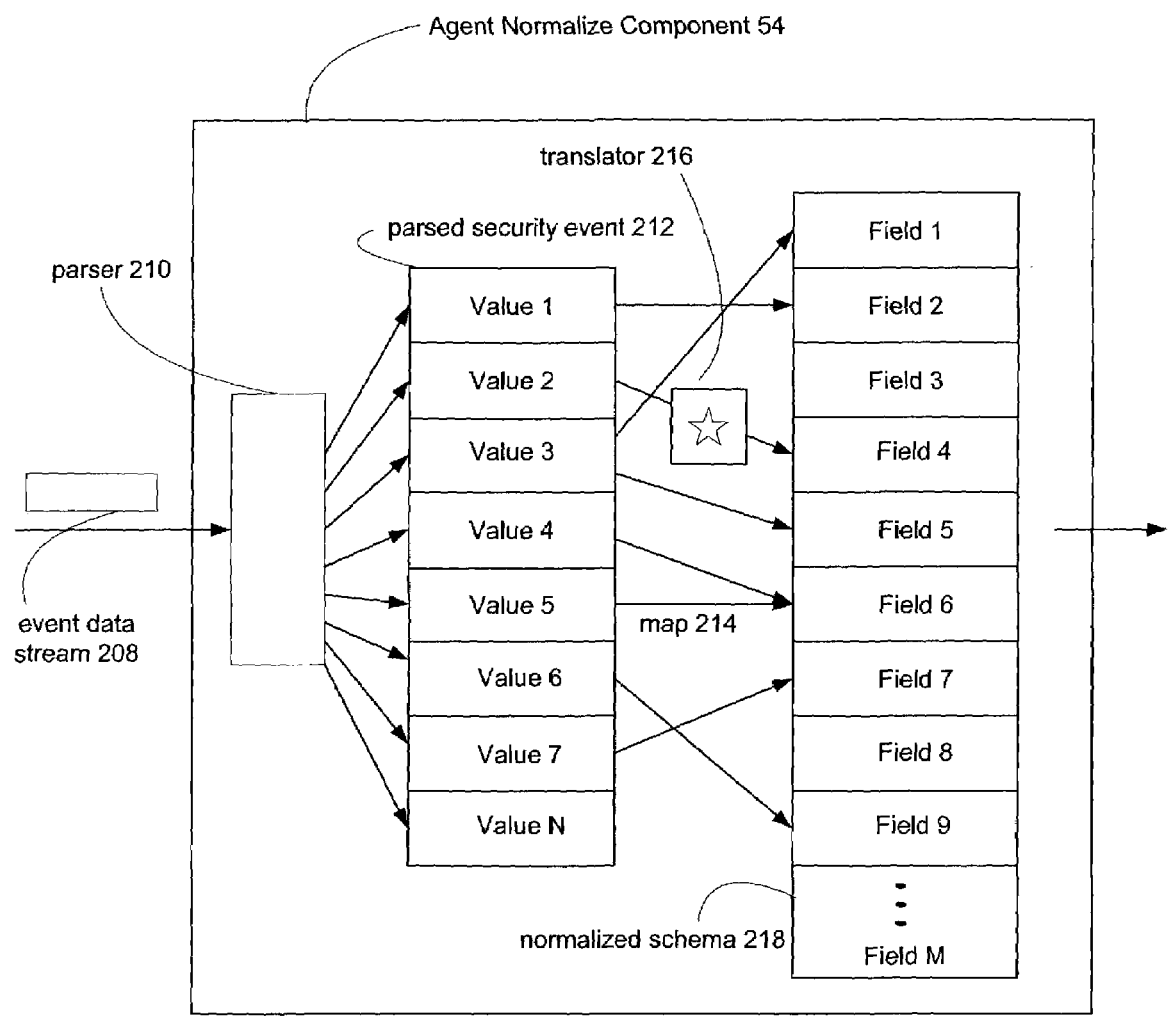
FIG. 7 is a block diagram of an agent normalize component according to an embodiment of the present invention.

Embodiments of the agent normalize component 54 are further described with reference to FIG. 7. A security event in the form of an event data stream 208 is parsed by the parser 210 to create a parsed security event 212 that can be mapped to a normalized schema 218.

The event data stream 208 is raw event data.

The parser is configured to identify the kind of event represented by the raw event data and interpret the values contained in the event stream. For example an event data stream such as "User logged in from 10.10.10.10" can be parsed into "source: User," "action: logged in," "source IP: 10.10.10.10." The event can be identified as a log in type event by matching an expression such as "* logged in from *." In one embodiment the parser 210 is implemented declaratively using Regular Expression. Such an embodiment is demonstrated more fully in Appendix C, in the context of an ArcSight™ Agent available from ArcSight, Inc.

The values of the parsed security event 212 are then used to populate the fields of a normalized event conforming to the normalized event schema 218. Map 214 performs this mapping. For example, map 214 populates Field 2 of the normalized schema 218 with Value 1 of the parsed security event 212. In other words, map 214 maps Value 1 to Field 2.

Map 214 can perform simple mapping, such as the mapping of Value 1 to Field 2. For example, with reference to Table 2 above, the target IP value reported by the Check Point firewall was used to populate the Tgt_IP field of the normalized schema. Furthermore, map 214 can use a translator 216 to compensate for any semantic differences between the values as reported by the network device and the semantics used by the normalized schema. For example, the Check Point firewall value or "www-http" was translated to "80" when mapped to the Trg_Port field in Table 2. The translator 216 can be implemented using a lookup table or any other means for mapping.

The translator 216 can also perform other functions, such as value scaling. For example, if Value 2 represented the seriousness of the security event as determined by the network device, this seriousness may be on a different scale than the one used by the uniform schema 218. In one embodiment, the uniform schema 218 uses four severity levels: low, medium, high, and very high.

Thus, if the scale used by the network device has eight levels, one possible severity mapping would map severity level 1–2 to low, 3–4 to medium, and so on. However, other mappings may be more appropriate depending on the network device. For example, if a network device overrates the seriousness of events as compared to other heterogeneous network devices, its reported severity may be mapped to lower severity levels to normalize the severities in relation to these other network devices.

Furthermore, map 214 can also map one value to any number of fields. This is demonstrated in FIG. 7 by Value 3 being used to populate both Field 1 and Field 5. For example, the seriousness of the security event can be mapped through a translator 216 that performs the severity mapping, and can also mapped unaltered, that is as originally reported by the network device, to another field to preserve all the values contained in the security event.

Similarly, any number of values can be mapped to a single field where multiple values are needed to fully populate the field. This is demonstrated in FIG. 7 by Value 4 and Value 5 both being used to populate Field 6. For example, a timestamp may need to be assembled from a time value and a date value. Similarly, an IP address may be assembled from two values, each containing an octet.

The normalized event conforming to the normalized schema 218 can have various fields. Some example fields are given by Table 2. One embodiment for the fields of the normalized schema 218, in the context of an ArcSight™ Agent available from ArcSight, Inc., with descriptions of each field is shown in Appendix A. However, many of the fields can be omitted in some embodiments, or new fields substituted or added in others.

Furthermore, there are many ways to implement map 214. In one embodiment, the map 214 depends on the values of the received security event, which in turn depends on the type of network device the agent 12 is monitoring. Several example mapping used by various ArcSight™ Agents available from ArcSight, Inc. are provided in Appendix B. Other mappings for these devices are also possible. Furthermore, new mappings can be added to accommodate new network devices, or network devices not described in Appendix B.

In one embodiment, all values are used to populate the fields of the normalized schema 218. However, in other embodiments, certain values may not be mapped, or mapped only after passing through a translator 216. After the map 214 is performed, the normalized event conforming to the normalized schema 218 can be sent for further processing, such as aggregation, batching, transport, and correlation.

Agent Aggregate Component

Figure 8:
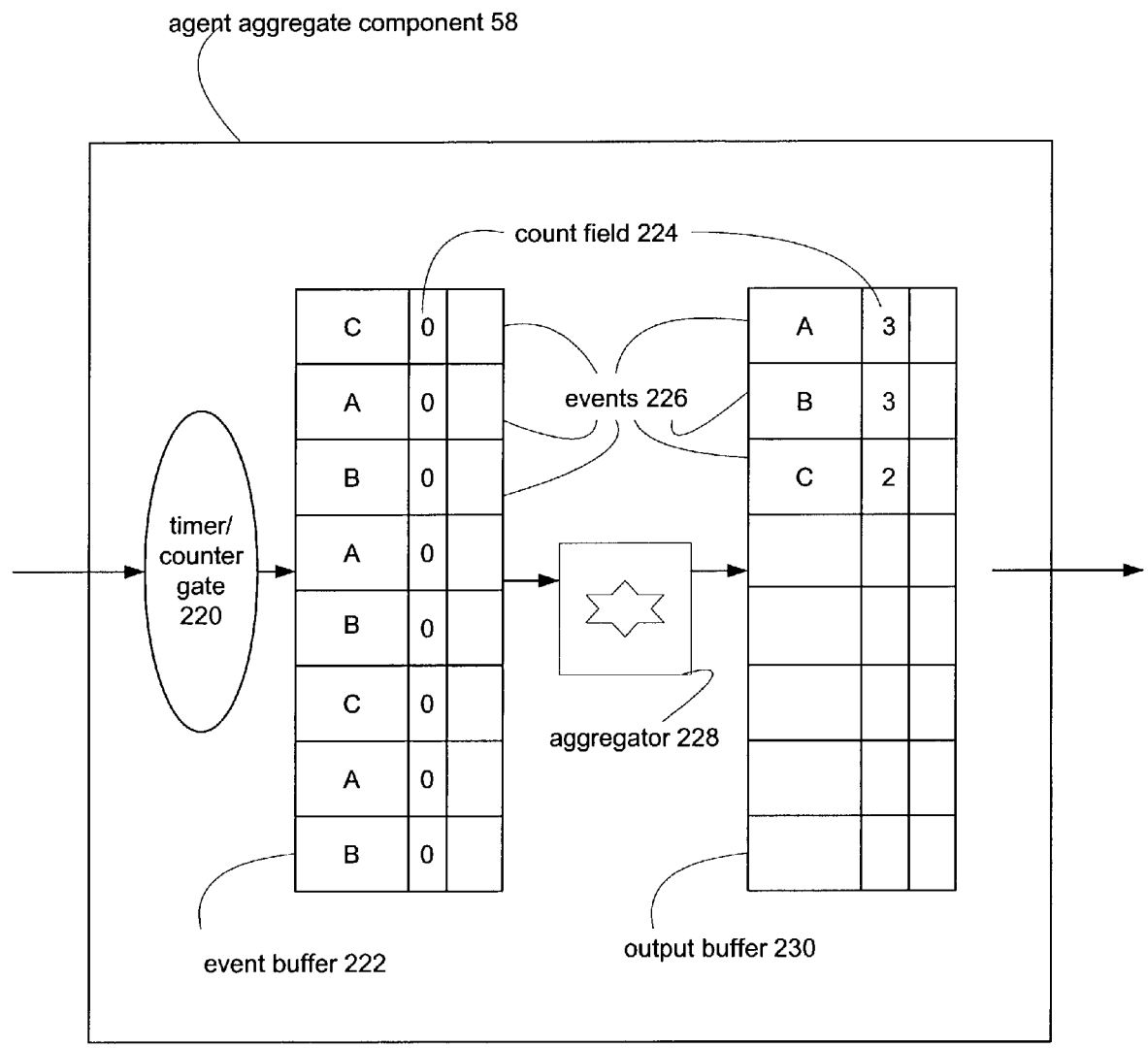
FIG. 8 is a block diagram of an agent aggregate component according to an embodiment of the present invention.

One embodiment of the agent aggregate component 58 is now described with reference to FIG. 8. As shown in FIG. 8, events 226 get stored in the event buffer 222 of the agent aggregate component 58 through the operation of a timer/counter gate 220. In one embodiment, the events 226 have already been normalized by the agent normalize component 54 to aid the aggregation process.

One of the fields of the normalized schema used by these normalized events 226 is a count field 224 that indicates how many times an event was received. Prior to aggregation, this count field 224 can be initialised to indicate that the event has not yet gone through aggregation. In one embodiment, the count field 224 is initialised to zero.

In one embodiment, the timer/counter gate 220 is implemented as a counter that counts the number of events 226 received by the agent aggregate component 58. For example, the counter can be configured to fill the event buffer 222 with 30 events at a time. In another embodiment, the timer/counter gate 220 is implemented as a timer that lets events through for a period of time. For example, the timer can be configured to collect events 226 in the event buffer 222 for five minutes.

When the timer/counter gate 220 indicates that the event buffer 222 is ready for aggregation, e.g. when the counter reaches a predetermined number or when the timer expires, the events 226 in the event buffer 222 are passed to the aggregator 228. The function of the aggregator 228 is to count the number of like events in the event buffer 222 and to output each distinct event only once with the count field 224 indicating the number of times like events were aggregated.

For example, in FIG. 8, the events 226 labelled with the same letter symbolize like events, and the events labelled with different letters symbolize distinct events. Thus, in the example of FIG. 8, aggregator 228 receives the events C,A,B,A,B,C,A,B and aggregates them to output events A,B,C to the output buffer 230. FIG. 8 also shows that the aggregator 228 has changed the count field 224 of these events 226 from their initial values of zero, to the appropriate aggregated count for the distinct events. Thus, e.g., event A has a count field of three, indicating that three events like event A were processed by the aggregator 228.

Figure 9:
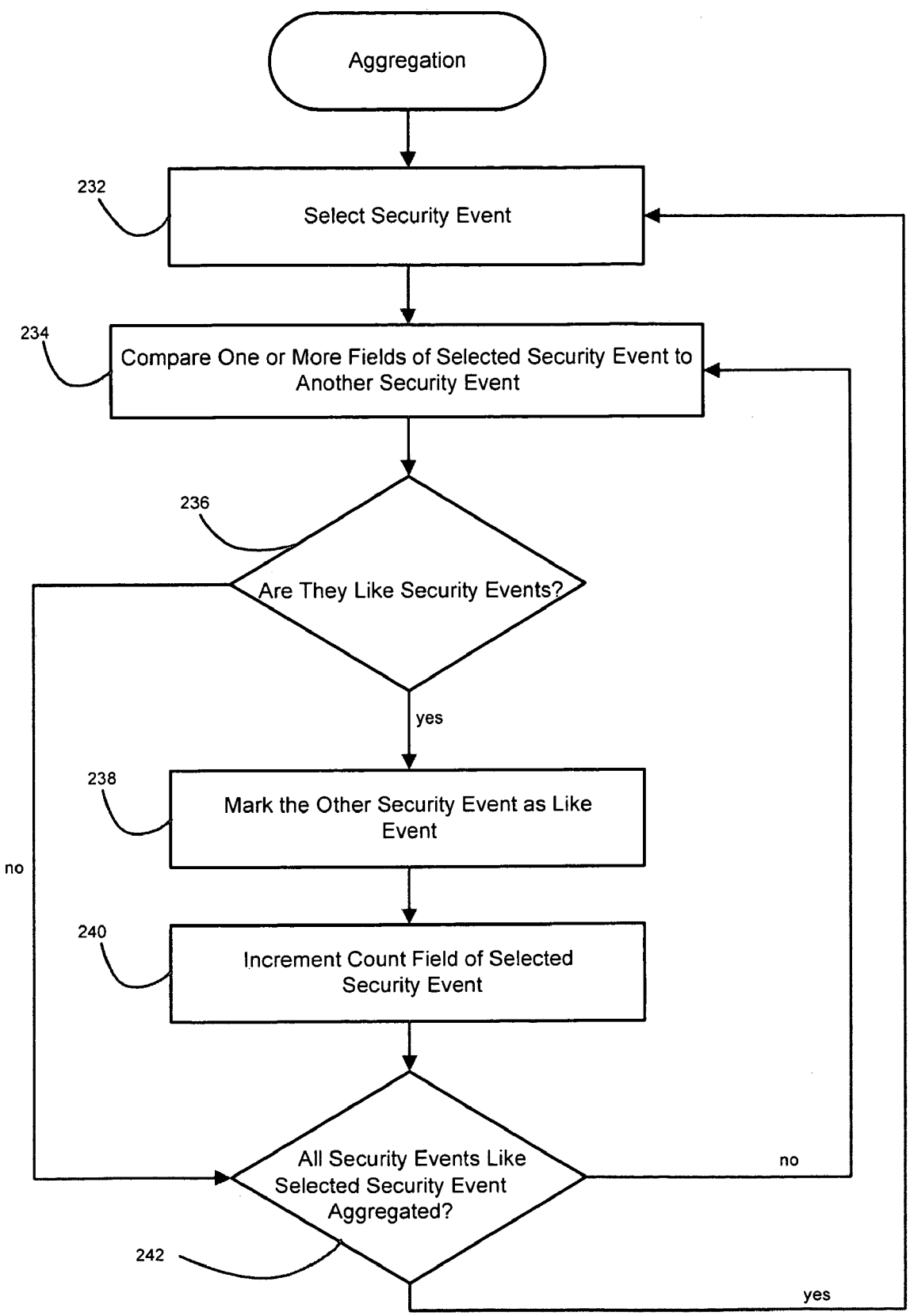
FIG. 9 is a flowchart illustrating a method, according to one embodiment of the invention, of security event aggregation.

One embodiment of the operation of the aggregator 228 is now described with reference to FIG. 9. The input of the aggregator 228 is the event buffer 222 containing all the received security events to be aggregated. In block 232, the aggregator 228 selects a security event. This can be done in order, randomly, or in any other manner.

Then, in block 234, the aggregator 228 compares one or more fields of the selected security event to another security event. The set of fields being compared are selected such that they are identical in like events. In other words, whether two events are like each other is defined by having an set of fields that are identical. In one embodiment, this one or more fields in the set are all fields except time related fields. Fields such as event time and time zone and agent time and time zone can be excluded from the fields being compared because like events can occur at different times.

In block 236, a decision is made based on the comparison in block 234 whether the two security events are alike. If they are not alike, aggregation proceeds to block 242 discussed below. If they are alike, then the other security event that is being compared to the selected security event is marked as alike in block 238. This can be done by discarding the other event from memory, ignoring the other event, or otherwise identifying the other event as no longer relevant.

In block 240, the count field of the selected security event is incremented to reflect that the other event was like the selected event. For example, if the selected event's count field is initialised to 0, then it would be incremented to 2, to reflect that up to this point, two instances of the selected security event have been found in the event buffer 222. Similarly, if the selected event has a count field of 3, it would be incremented to 4 in block 240.

In block 242, a decision is made whether all events that may be like the selected event have been aggregated. This decision can be based on whether all events other than the selected event have been compared to the selected event in block 234. If not, then the selected security event can be compared to another event from the event buffer 222. However, if all possible other security events have been checked for likeness to the selected security event, then the process can begin anew with block 232, with the selection of another distinct security event from the event buffer 222.

The events 226 in the output buffer 230 can then be sent for further processing, such as batching and correlation. As illustrated in FIG. 8, the output buffer uses less than half of the memory that the input buffer uses. This conserves memory and reduces the bandwidth required for sending the events 226 to the manager 14.

As discussed above, the fields related to the time of the security events can be excluded from the set of fields used to determine whether two events are like, since like events may be reported at different times. This type of aggregation does not preserve the precise time for all identical events, but does provides the highest degree of efficiency. In one embodiment, the aggregator can note the earliest and the latest time for each like event, and can fill in fields, e.g., an event start and an event_end field, in events 226 to that effect.

As discussed above, for one set of like events, such as the events labelled A, after the aggregator 228 determines which events 226 belong in the set, the aggregator 228 outputs a single occurrence of the like events. For that single occurrence, the aggregator 228 updates the count field 224 of the event to reflect the number of like events in the set.

The output of the aggregator 228 is shown in FIG. 8 to be placed in an output buffer 230 until all events 226 in the event buffer 222 have been aggregated. However, the aggregated events 226 being output from the aggregator 228 can be sent directly for further processing.

Agent Batch Component

The security events can next be processed by the agent batch component 60. The agent batch component 60 performs the batching of security events into event batches 262 to be transmitted. Since there is a certain amount of overhead associated with transmitting events from an agent to the agent manager 26, such as transport protocol overhead and system communication overhead, it can improve overall performance of the network security system to batch security events prior to sending them to the security manager, or other further processing.

Figure 10:
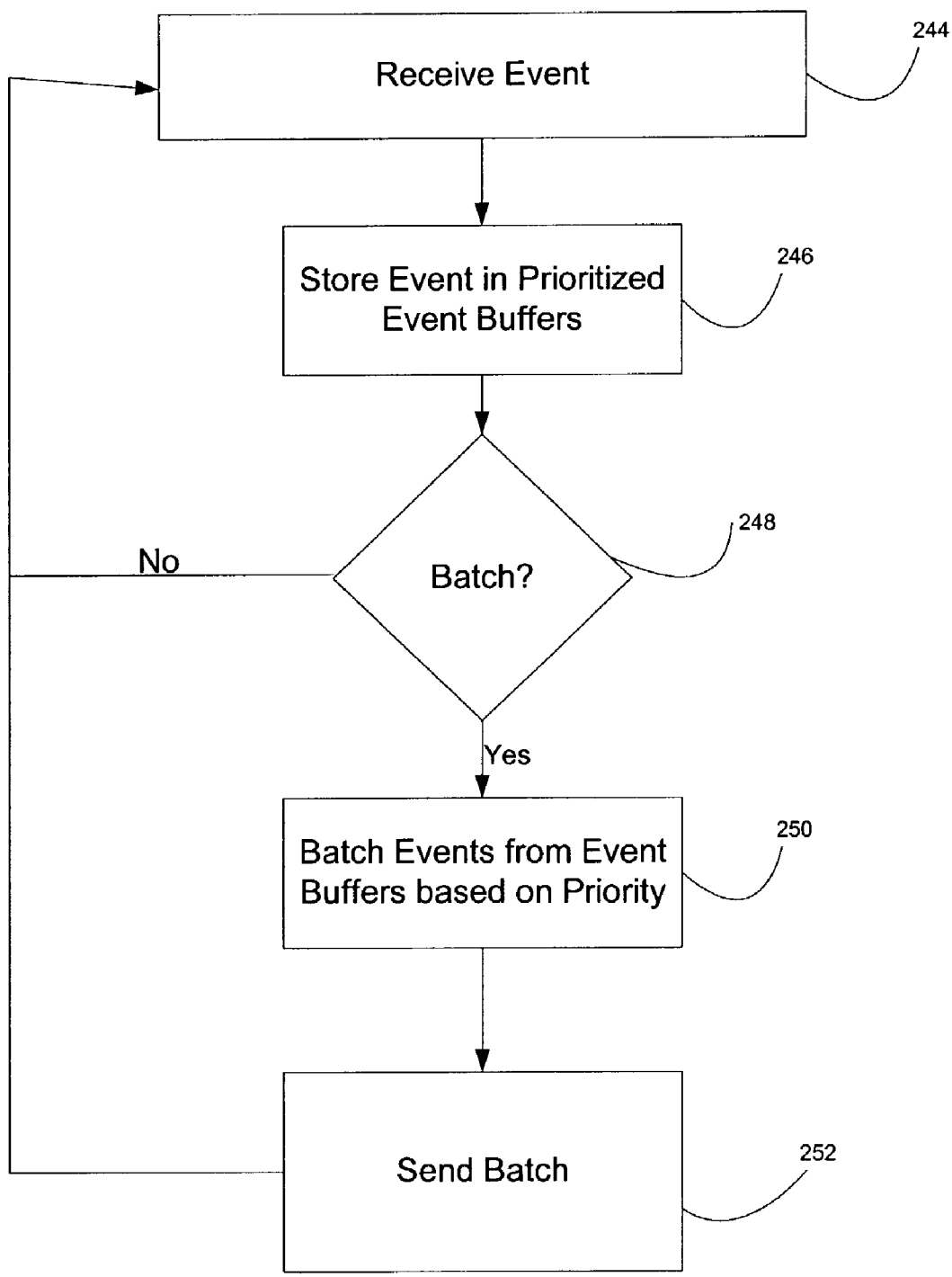
FIG. 10 is a flowchart illustrating a method, according to one embodiment of the invention, of security event batching.

The batching can be done according to a configurable time limit, e.g. transmitting a batch every twenty minutes, or according to a number limit, e.g. transmitting a batch when a hundred security events are received and collected. The batching can be simple or prioritized. One embodiment of prioritized batching is described with reference to FIG. 10. In block 244, a security event is received by the agent batch component 60.

Then, in block 246, the received security event is stored in a prioritized event buffer. Thus, a high priority event is stored in a high priority buffer, and a low priority event is stored in a low priority buffer. The buffers can be delineated logically, and need not be physically separate in memory.

In block 248, a decision is made whether batching and transport should be performed. This can be based on the expiration of a timer, the collection of a threshold number of security events in one or more of the buffers, or various other limits. If batching is not yet to be performed, another security event is received in block 244, and the process begins anew.

If, however, batching is to be performed, then, in block 250, a batch is created from the stored security events based on priority. In one embodiment, the batch is filled with events from the highest priority buffers until the batch is full. In another embodiment, a configurable mix of priorities is included in each batch. Many other priority based batching schemes are possible.

When the batch is complete, in block 252, it is sent for further processing. In one embodiment, the agent manager 26 resides on a different machine than the agent collecting the security events. Thus, sending the batch can be done using any form of wired or wireless communication, including dial-up modem or Local Area Network (LAN) connections. In one embodiment, the batch is sent using an http request.

Figure 11:
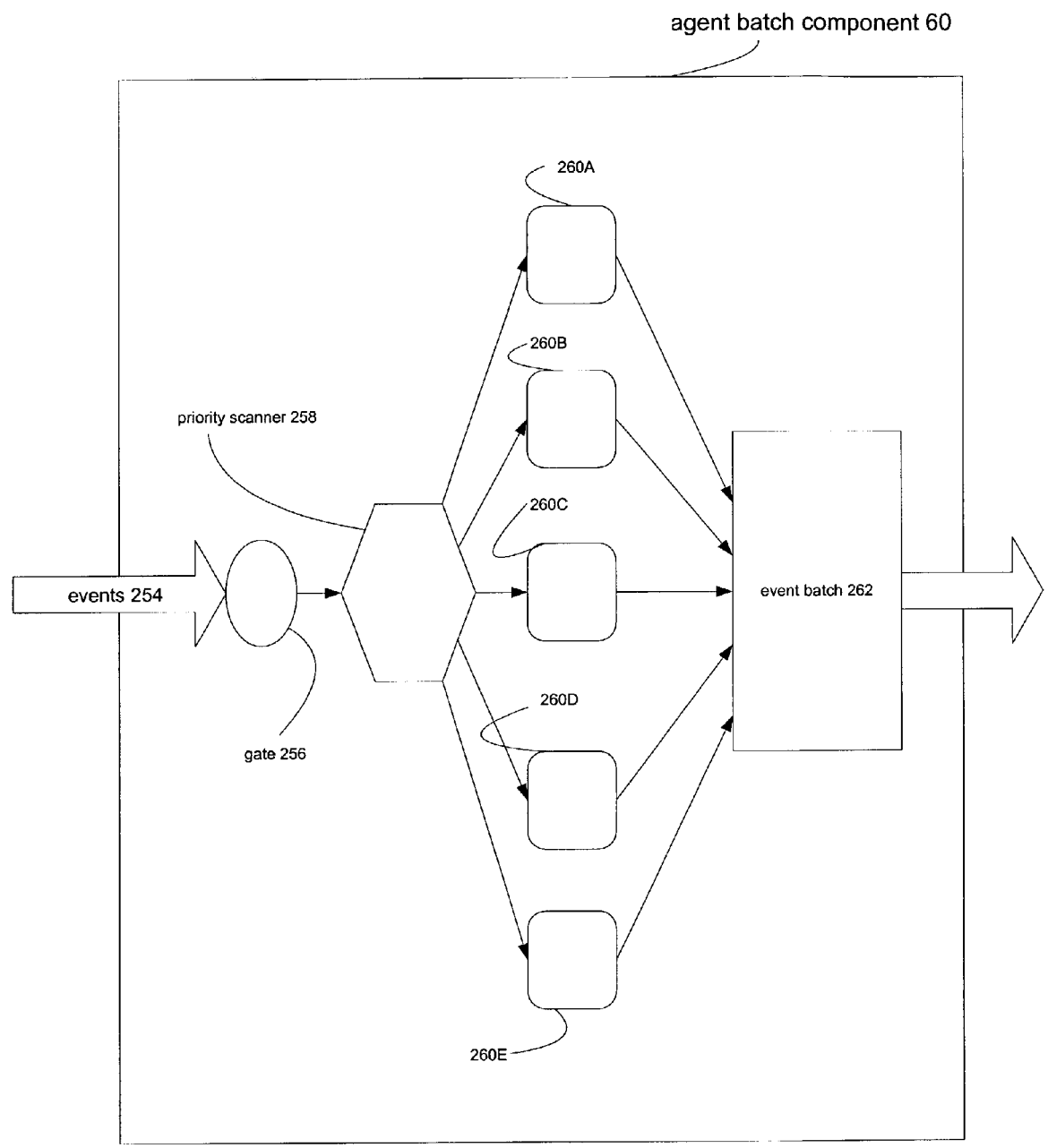
FIG. 11 is a block diagram of an agent batch component according to an embodiment of the present invention.

Another embodiment of the event batch component 60 is described with reference to FIG. 11. Security events 254 are received by the event batch component 60 through a gate 256. Gate 256 can be a timer or counter that determines when a event batch 262 should be created and transmitted.

Next, the security events 254 are sorted by priority into event buffers 260A–E by priority scanner 258. In one embodiment, the received security events 254 are normalized security event that have already been processed by the agent normalize component 54. Thus, they include a severity or priority field that uses a normalized scale.

In one embodiment, this scale has priorities: very-high, high, medium, low, and unknown. Event buffers 260A–E are each assigned to one of these priorities, e.g., very-high priority security events are stored in event buffer 260A by the priority scanner 258. Since each security event includes a priority field, the priority scanner can sort the security events 254 based on the information contained in this field.

When the gate 256 indicates, an event batch 262 is created using the security events 254 stored in the prioritized event buffers 260A–E. In one embodiment, the event batch 262 is of a fixed size. The event batch 262 can be created using security events from high to low priority event buffers 260A–E until the event batch 262 is full. Also, during certain time periods, like peak traffic times, the batching may be configured to not use security events stored in the low priority buffers, e.g. event buffer 260D–E. The size of the event batch 262 and the batching frequency of the gate 256 can both be configurable.

In some embodiments, security events that have been stored in a buffer for longer than a threshold time or number of batches sent can be transferred to a higher priority event buffer to increase likelihood of transmission. However, the priorities of these security events are not changed, only their batching priority changes. In yet other embodiments, batches of higher priority events may be sent more frequently than batches of lower priority events. The event batch is then sent for further processing.

The agent resolver component 62 will now be described. The agent resolver component 62 is utilized to fill in incomplete address descriptions on event. Also, the agent resolver component 62 performs reverse DNS lookups to resolve hostnames and domains to INET address. In addition, the agent resolver component 62 performs DNS lookups to resolve hostnames and domains to INET address.

The agent 12 also includes an agent transport component 64. The agent transport component 64 is where messages transmitted to the agent manager 26 exit the agent 12 and messages transmitted from the agent manager 26 enter the agent 12.

Figure 12A:
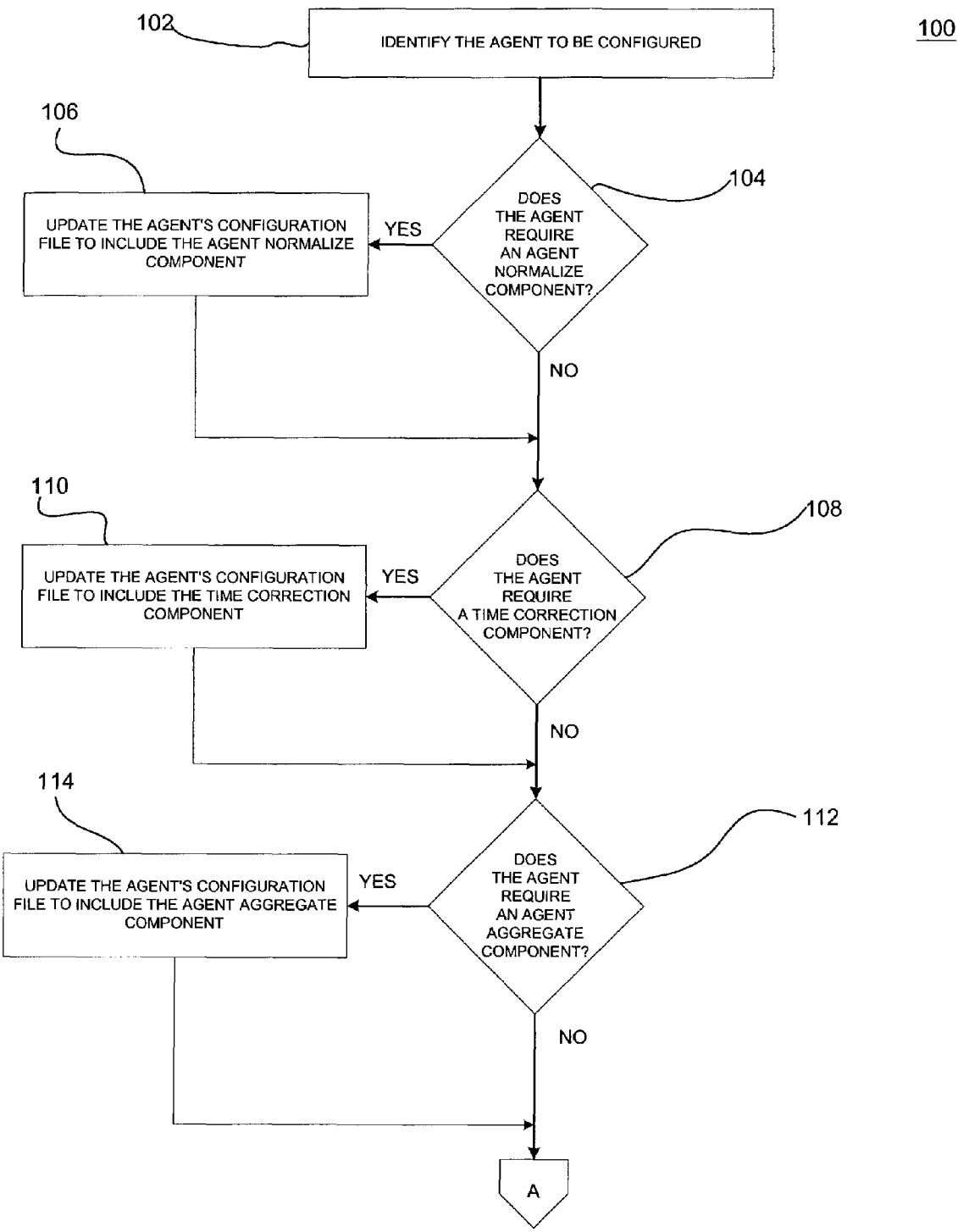
FIG. 12 is a flowchart illustrating a method, according to one embodiment of the invention, of configuring a software agent.

FIG. 12A is a flow chart illustrating a method 100, according to one embodiment of the invention, of configuring an agent 12. At block 102 the identity of an agent 12 to be configured is identified. In the exemplary embodiment, the agent is configured as a result of manual processing.

At block 104, a determination is made as to whether the agent 12 requires an agent normalize component 54. In the preferred embodiment, the decision is made by a user and entered via console/browser 16.

At block 106, if the user does want to include an agent normalize component 54, manager 26 communicates via a network with agent 12, and uploads the necessary configuration information needed to update the configuration file associated with agent 12.

At block 108, a determination is made as to whether the agent 12 requires a time correction component 56. Similar to the description above, the decision is entered by a user and applied via console/browser 16.

At block 110, if the user does want to include a time correction component 56, manager 26 communicates via the network with agent 12, and uploads the necessary configuration information needed to update the configuration file associated with agent 12.

At block 112, a determination is made as to whether the agent 12 requires an agent aggregate component 58.

At block 114, if the user does want to include the agent aggregate component 58, manager 26 communicates via the network with agent 12 and uploads the necessary configuration information needed to update the configuration file associated with agent 12.

Figure 12B:
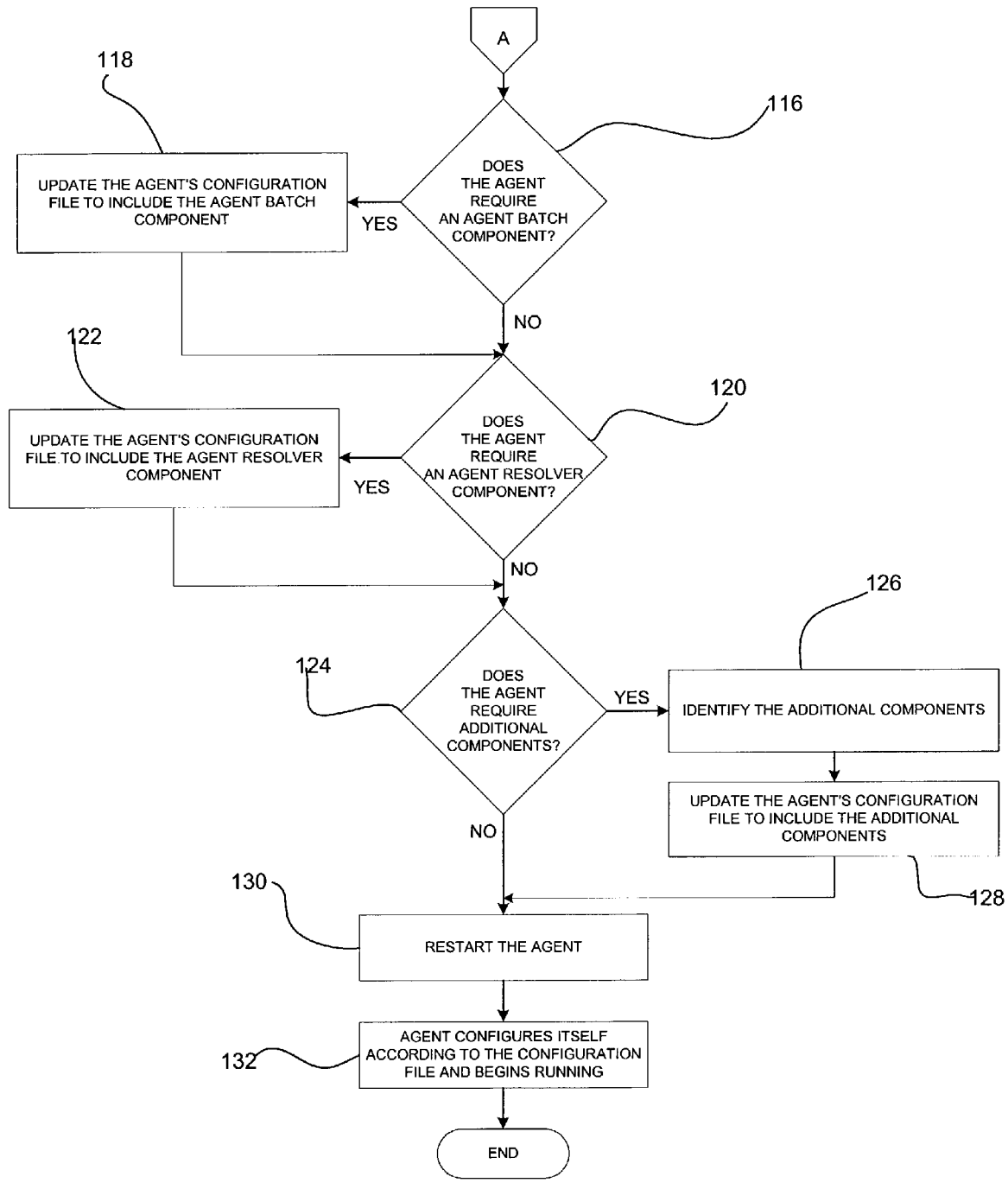

In FIG. 12B, at block 116, a determination is made as to whether the agent 12 requires an agent batch component 60.

At block 118, if the user does want to include the agent batch component 60, manager 26 communicates via the network with agent 12 and uploads the necessary configuration information needed to update the configuration file associated with agent 12.

At block 120, a determination is made as to whether the agent 12 requires an agent resolver component 62.

At block 122, if the user does want to include the agent resolver component 62, manager 26 communicates via the network with agent 12 and uploads the necessary configuration information needed to update the configuration file associated with agent 12.

At block 124, a determination is made as to whether the agent 12 requires additional components 66. At block 126, the required additional components 66 are identified. At block 128, manager 26 communicates via the network with agent 12 and uploads the necessary configuration information needed to update the configuration file associated with agent 12.

At block 130 the agent 12 is restarted. At block 132, in response to being restarted, agent 12 reconfigures itself according to the configuration file modified in method 100.

While method 100 provided for a user stepping through a process in which a decision is made about each of a multiple of components, the user is not required to follow such a process. For example, a user may simply modify the time correction component 56 of an agent 12 via the console/browser interface 16. In response, the configuration file associated with the agent is updated at manager 14 and the agent 12 configuration information is sent by agent manager 26 to agent 12. In one embodiment the agent is restarted in order for the changes to take effect.

Figure 13:
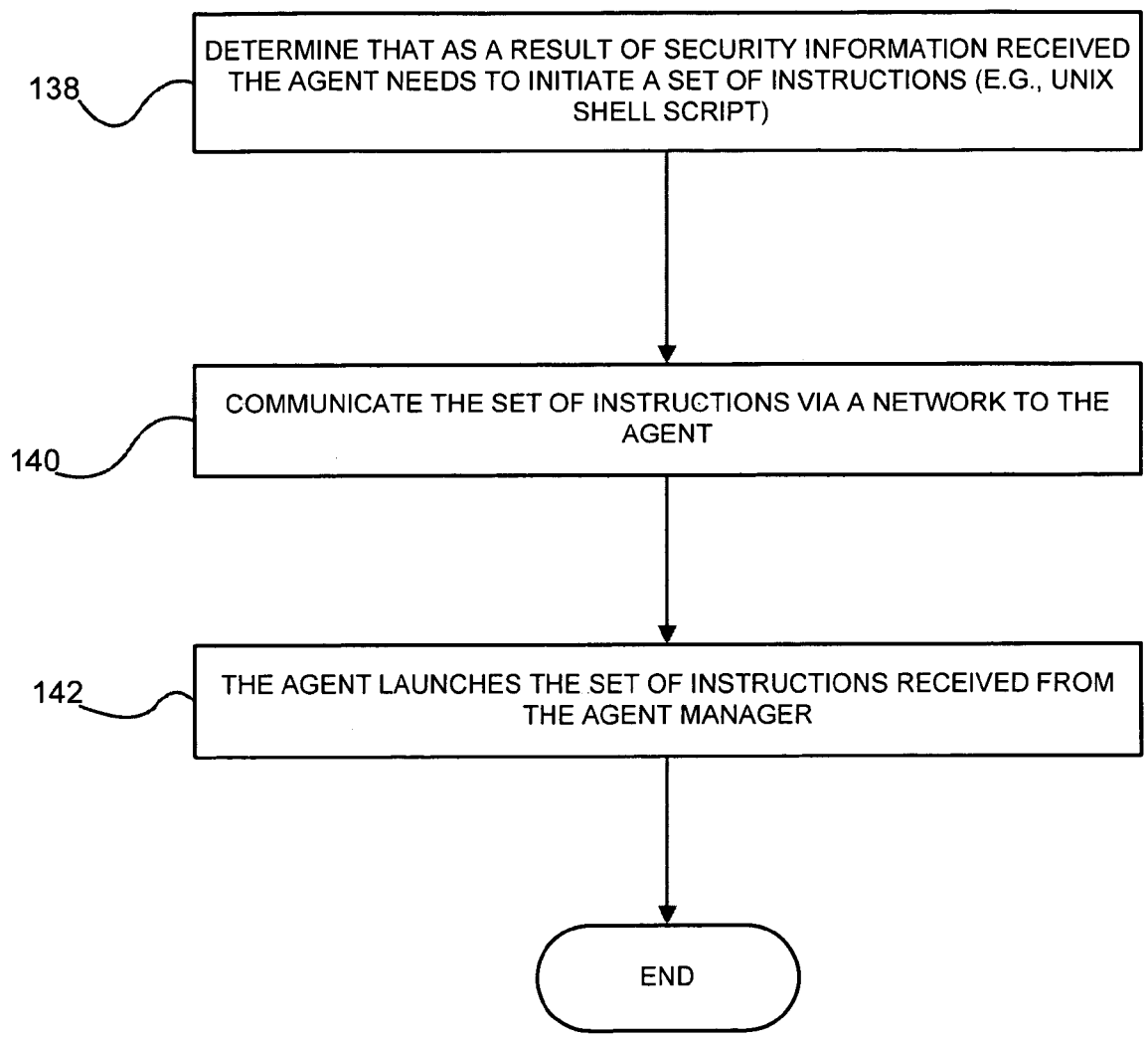
FIG. 13 is a flowchart illustrating a method, according to one embodiment of the invention, of automatically altering the operation of a software agent.

FIG. 13 is a flow chart illustrating a method 136, according to one embodiment of the invention, of automatically altering the operation of an an agent 12.

At block 138, manager 14 determines that as a result of security information received the agent needs to initiate a set of instructions (e.g., UNIX shell script) in response.

At block 140, agent manger 26 communicates the set of instructions via a network to agent 12.

At block 142, the set of instructions are received by agent 12 and initiated according to the direction of the agent manager 26.

Bi-Directional Communication

Figure 14:
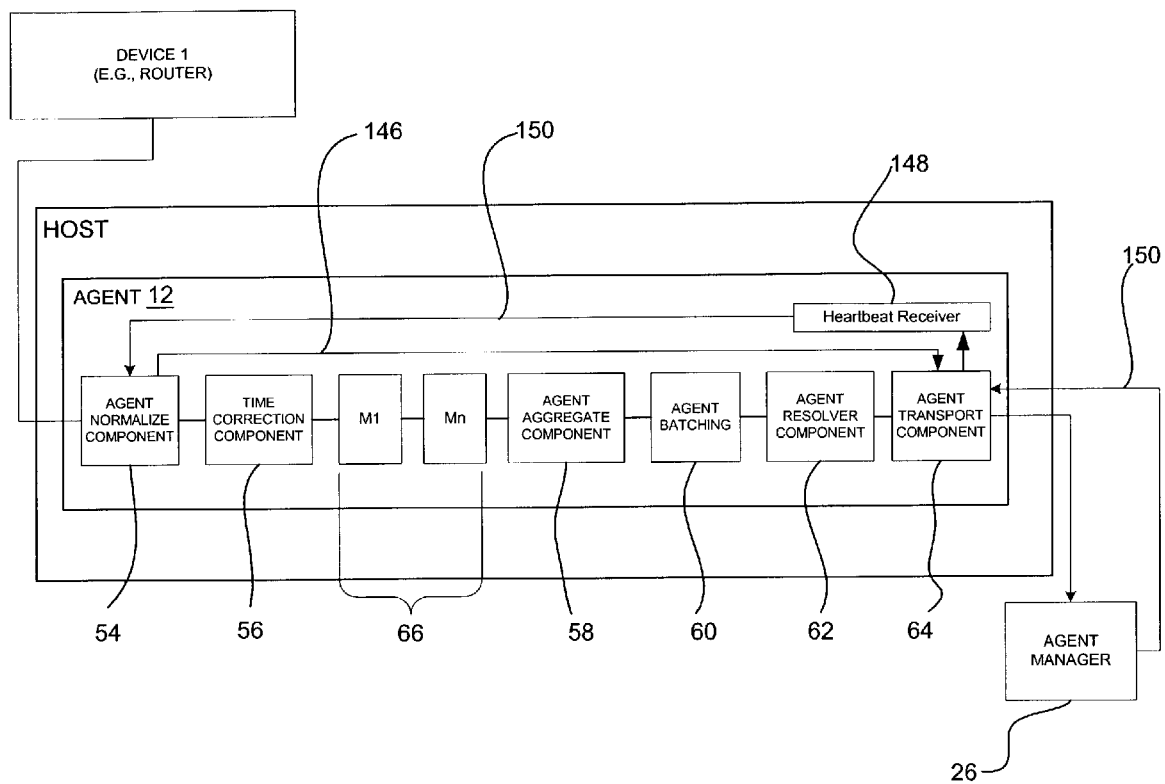
FIG. 14 is a diagrammatic representation of bi-directional communication between a software agent within a host and an agent manager.

FIG. 14 is a diagrammatic representation of bi-directional communication between an agent 12 within a host and an agent manager 26. In addition to the components described in FIGS. 4 and 5 earlier, a heartbeat send path 146 is shown. The heartbeat send path 146 provides a section of the route that heartbeat messages will take during transmission from an agent 12 to an agent manager 26. Also, a heartbeat response message path 150 is shown as the route that the heartbeat response message from the agent manager 26 to the agent 12 will take. Included within the heartbeat response message path 150 is a heartbeat receiver 148.

Figure 15:
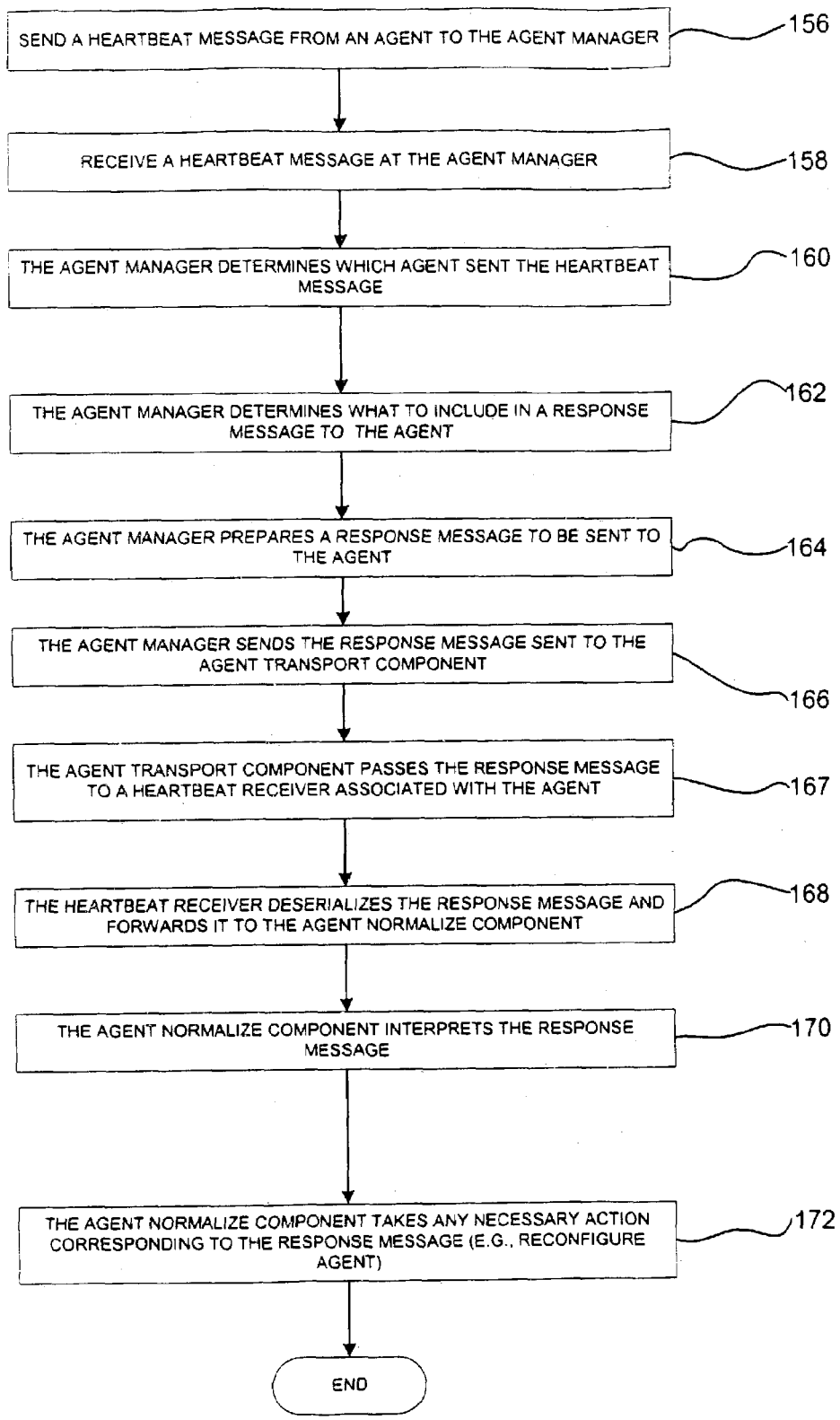
FIG. 15 is a flowchart illustrating a method, according to one embodiment of the invention, showing bi-directional communication between a software agent and an agent manager.

FIG. 15 is a flow chart illustrating a method 154, according to one embodiment of the invention, showing bi-directional communication between an agent 12 and an agent manager 26.

At block 156, a heartbeat message is sent from an agent 12 to the agent manager 26. The interval of time between which heartbeat messages are sent is configurable and may be set in the agent 12 configuration file (e.g., one heartbeat message every ten seconds). In the exemplary embodiment, the heartbeat message is sent from the agent normalize component 54 via the heart beat send path 146 to the agent transport component 64. The agent transport component 64 then forwards the heartbeat message (e.g., via the HTTP protocol) to the agent manager 26.

At block 158, the agent manager 26 receives the heartbeat message. At block 160, the agent manager 26 determines which agent 12 sent the heartbeat message. In the exemplary embodiment, the agent manager 26 makes this determination by comparing a unique identifier included within the heartbeat message against a table of identifiers. The table of identifiers includes a unique identifier for each agent 12 associated with the agent manager 26.

At block 162, the agent manager 26 determines what (e.g., commands, instructions, etc.) to include in a response message to the agent 12. The agent manager 26 makes the determination based user initiated instructions (e.g., configuration updates), and rules included within the rules engine 18. An example of user initiated instructions may be instructions requesting that the agent aggregate component 58 be removed from the agent. In the exemplary embodiment, the user would enter instructions via the console/browser interface 16. The instructions are then forwarded to the agent manager 26, where they will be included within a response message to the agent. While the example describes user initiated instructions to reconfigure and the agent 12, user initiated instructions include any instructions to alter the configuration or alter the actions of the agent 12.

The rules engine relies on a variety of factors, including previous event data received from the agent 12, the current security level, and user settings. An example of how the rules engine 18 effects what is included in a response message may be the automatic generation of a set of instructions (e.g., UNIX shell script, LINUX shell script, Windows batch file, etc.) in response to criteria meeting conditions in the rules engine 18. Such a set of instructions in one example might tell a firewall to shut down a communications port.

At block 164, the agent manager 26 prepares the response message to be sent to the agent 12. The response message includes commands to launch the instructions determined at block 162. In the exemplary embodiment, the commands include pause, stop, restart, reconfigure, and a command to launch the automatically generated instructions discussed above. The pause command prevents the transmission of events to the agent manager 26. However, the pause command does not prevent the processing of events. The stop command prevents the receipt of events at the agent manager 26 from the agent 12. But the heartbeat messages from the agent 12 to the agent manager 26 will continue after a stop command has been initiated. The restart command allows previously stopped events to be received, processed, and transmitted from the agent 12 to the agent manager 26 once again. The reconfiguration command alters the configuration of an agent 12, and includes the user initiated instructions entered at block 162. The reconfiguration command provides for adding, deleting, or modifying instructions within an agent 12 configuration file.

At block 166, the agent manager 26 sends (e.g., the HTTP protocol) the response message to the agent transport component 64. In the exemplary embodiment, the response message is sent back via the same port through which the heartbeat message was received. The same path is used to send heartbeat messages and response messages resulting in bi-directional communication between agents 12 and the agent manager 26. At block 167, the agent transport component 64 passes the response message to a heartbeat receiver 148 associated with the agent 12

At block 168, the heartbeat receiver 148 deserializes the response message and forwards it to the agent normalize component 54. Through deserialization, the message is converted into an object which is intelligible by the agent normalize component 54. At block 170, the agent normalize component 54 interprets the response message to determine if any commands or configuration control information was included in the response message.

At block 172, the agent normalize component 54 takes any necessary action (e.g., pause, stop, restart, reconfigure, configuration controls, etc.) corresponding to the response message. For example, the response message may include a configuration command and the necessary configuration information. The configuration may for example request that the instruction to include the agent aggregate component 58 in the agent 12 configuration file is to be deleted.

Thus, updateable modular software agents utilized in a computer-based system for capturing, correlating and reporting security events from heterogeneous sources have been described. In the foregoing description, the various examples and embodiments were meant to be illustrative of the present invention and not restrictive in terms of their scope. Accordingly, the invention should be measured only in terms of the claims, which follow.

APPENDIX A

ArcSight Data Fields

| Data Field | Description |
| --- | --- |
| Additional Data Name | The name of the additional data item that could not fit into any of the standard fields. The ArcSight SmartAgent sets this field based on the name in the original message from a device. There can be an unlimited number of additional data items. |
| Additional Data Type | The data type of the additional data item. The default value is "string." The permitted values for this attribute are:<br>• 0 boolean: the value of the data item a boolean value, example, the strings "true" or "false"<br>• 1 byte: the element content is a single 8-bit<br>• 2 character: the element content is a single<br>• 3 data-time: the element content is a date-time<br>• 4 integer: the element content is an integer<br>• 5 ntpstamp: the element content is an NTP timestamp<br>• 6 portlist: the element content is list of ports<br>• 7 real: the element content is a real number<br>• 8 string: the element content is a string<br>9 xml: the element content is XML-tagged data |
| Additional Data Value | The value of the data item. |
| Agent Address | The IP address of the host on which the ArcSight SmartAgent is running. The address is in dotted-decimal format. |
| Agent Host Name | The name of the host on which the ArcSight SmartAgent is running. |
| Agent ID | The globally unique ID (UUID) of the ArcSight SmartAgent. |
| Agent Location | The geographical or physical location of the ArcSight SmartAgent. |
| Agent Time | The date and time the ArcSight SmartAgent created the event, stored in GMT time. |
| Agent Time Offset | The time zone offset for the time zone where the ArcSight SmartAgent is located. |
| Agent Type | The type of ArcSight SmartAgent, such as CheckPoint Firewall ArcSight SmartAgent. |
| Agent Version | The version of the ArcSight SmartAgent. |
| ArcSight Category | The general category the event belongs to according to ArcSight.<br>For example, any Buffer Overflow attack can be in the category "Buffer Overflow." |

| Data Field | Description |
|---|---|
| ArcSight Severity | The severity of the event in relation to other events. The permitted values for this attribute are:<br>• Very-High (4)<br>• High (3)<br>• Medium (2)<br>• Low (1)<br>• Unknown (0) |
| Base Event Count | This field is dependant on the Event Type. If the Event Type is:<br>• Base Alert: the number zero is displayed because there is only one simple event occurrence<br>• Aggregated: the number states how many base events combined into a single event<br>• Correlated: the number states how many base events in the entire rule chain led to the generation of the correlated event |
| Custom Number 1-3 | 3 custom numbers are provided to store enterprise specific information. You can define custom names for these fields and display them in the ArcSight Console.<br><br>For example, Custom Number 1 can be used to represent a specific severity level and be renamed (i.e., "Company Severity Level"). When this is specified, this information is displayed as a customized value in the ArcSight Console.<br><br>Custom Number 3 stores the largest absolute value from a delta report. For more information on delta reports, see X. |
| Custom Severity | The severity of the event according to the severity schedule defined by the enterprise, this can be either numeric or symbolic. |
| Custom String 1-6 | 6 custom strings are provided to store enterprise specific information. You can define custom names for these fields and display them in the ArcSight Console.<br><br>Custom String 3 stores the data field of the largest absolute value from a delta report. For more information on delta reports, see X. |
| Detect Time | The time when the device detected the event. This time is in the original message reported to and received by the ArcSight SmartAgent. |
| Detect Time Offset | The offset for the time where the device is located. |
| Device Action | The action that has been taken by the device. For example, a firewall device's action is normally either "accept" or "reject". |

| Data Field | Description |
| --- | --- |
| Device Address | The IP address of the device, such as firewall or IDS, in dotted-decimal format. |
| Device Host Name | The name of the host for the device. |
| Device Inbound Interface | The interface (NIC - network interface card) for the inbound packages in the event, normally only set by a firewall device. |
| Device Location | The geographical or physical location of the device. |
| Device Outbound Interface | The interface (NIC - network interface card) for the outbound packages in the event, normally only set by a firewall device. |
| Device Process Name | The name of the process in which the vendor product is running. |
| Device Product | The name of the product, such as RealSecure from the vendor ISS. |
| Device Severity | The severity of the event according to the device vendor's severity scheduled. It can be numeric or symbolic depending on the device vendor. |
| Device Vendor | The vendor of the device who defines the event names. Permitted values are:<br>• "unknown"<br>• "CVE"<br>• "Bugtraq"<br>• "CERT"<br>• "ArcSight"<br>• "ISS"<br>• "CISCO"<br>• "Check Point"<br>• "Microsoft"<br>• "NAI"<br>• "Snort"<br>• "Tripwire"<br>• "CiscoRouter"<br>• "Lucent"<br>• "Entercept" |
| Device Version | The current version of the device, such as ISS RealSecure 5.5 or 6.0. |

| Data Field | Description |
|---|---|
| Event Category | The general category the event belongs to. Currently, among ArcSight supported devices, only ISS RealSecure and Snort provide such categorization.<br><br>For example, an IIS Buffer Overflow attack can be in the category "Web Sever Buffer Overflow" or in the broader category "Buffer Overflow". |
| Event ID | A unique event identifier created by the ArcSight SmartAgent. |
| Event Name | The name of the event or other information allowing the user to determine what it is. |
| Event Status | The status of the event.<br><br>For example, if an attack occurs, a device (such as Tripwire) may report the status as one of the following:<br><br>• 1 - Blocked by the device successfully.<br>• 2 - Attack failed due to other defense mechanism(s).<br>• 3 - The device failed to block the attack and therefore the target may have been compromised.<br>• 4 - The device cannot determine the status (for example, unknown). |
| Event Type | Defines the event type and can be one of the following three types:<br><br>• Base Alert: an original message received from an ArcSight SmartAgent without further processing<br>• Aggregated: several events of the same type combined into a single event by an ArcSight SmartAgent<br>• Correlated: an event that is the result of a rule triggered by one or more events |
| File Name | The name of file, such as audited, created, deleted, or modified. |
| File Path | The path of the directory that contains the file. |
| File Type | The type of the file. Depending on the event, it can be an OS-level file type, such as file, directory, block device, character device, etc. or an application-level file type, such as config file, windows, registry key, log file, etc. |
| Protocol | The protocol used in the event, such as TCP, UDP, ICMP, SMTP, HTTP, RAP, etc. Currently, the set of valid values is not fixed. |
| Service | The internet service name such as web server, ftp server, or telnet. |

| Data Field | Description |
|---|---|
| Source Address | The IP address of the source in dotted-decimal notation format for the source node, both IPv4 and IPv6 are supported. |
| Source Domain | The domain of the source host. Its definition depends on the device. It can be an NT domain, a DNS domain, or a NIS/NIS+ domain, among others. Currently, only the NT Event Log Agent sets this field. For some ArcSight SmartAgents, it could also be used to store the V-LAN name. |
| Source Hostname | Information about the host or device that is causing the events such as network address or network name. |
| Source Port | The port number for the service. |
| Source Service Name | The name of the source service. Some devices may set this field and it may set it to a different value from that of the field "Service", which is the name of the target service. |
| Source User ID | Information about the user who is causing the event(s). |
| Target Address | The IP address of the target in dotted-decimal notation format for the target host, both IPv4 and IPv6 are supported. |
| Target Domain | The domain of the target host. Its definition depends on the device. It can be an NT domain, a DNS domain, or a NIS/NIS+ domain, among others. Currently, only the NT Event Log Agent sets this field. For some ArcSight SmartAgents, it could also be used to store the V-LAN name. |
| Target Hostname | The name of the target host. For example, it can be just the host name like "pikachu" or a DNS name like "pikachu.acme.com," depending on the device or ArcSight SmartAgent. |
| Target Port | The port on the target host used in the event. |
| Target User ID | The User ID (uid) or name of the target user. |
| Target Web Args | The argument(s) to the CGI scripts. This field is populated if the service is a Web service. |
| Target Web CGI | The CGI script name in the HTTP request. Here, CGI is a generic term for CGI, Servlet, JSP, ASP, etc. This field is populated if the service is a Web service. |
| Target Web Method | The HTTP method used in the request such as PUT or GET. |
| Target Web URL | The URL for the web service. This field is populated if the service is a Web service. |

APPENDIX B

Example Mappings from Various Network Devices to Normalized ArcSight Data Fields

Cisco Catalyst LAN Switch with IOS 12.0

| ArcSight Data Fields | Cisco Catalyst LAN Switch with IOS 12.0 Specific Event Definitions |
|---|---|
| Agent Type | syslog or syslog_pipe |
| ArcSight Severity | Very High (0-1), High (2-3), Medium (4-5), Low (6-7) |
| Custom Number 2 | packets |
| Custom String 1 | Original Syslog Message String |
| Custom String 2 | Facility |
| Custom String 3 | Mnemonic |
| Custom String 4 | list id |
| Detect Time | Date & Time When Event was Detected by the Device |
| Device Action | Action |
| Device Severity | 7-0 |
| Event Name | Router Message |
| Protocol | Protocol |
| Source Address | Source IP Address |
| Source Port | Source Port |
| Target Address | Destination IP Address |
| Target Port | Destination Port |

Cisco Internet Router 7100, 7200, 7600 with IOS 10.x

| ArcSight Data Fields | Cisco Internet Router 7100, 7200, 7600 with IOS 10.x Specific Event Definitions |
|---|---|
| Agent Type | syslog or syslog_pipe |
| ArcSight Severity | Very High (0-1), High (2-3), Medium (4-5), Low (6-7) |
| Custom Number 2 | packets |
| Custom String 1 | Original Syslog Message String |
| Custom String 2 | Facility |
| Custom String 3 | Mnemonic |
| Custom String 4 | list id |
| Detect Time | Date & Time When Event was Detected by the Device |
| Device Action | Action |
| Device Severity | 7-0 |
| Event Name | Router Message |
| Protocol | Protocol |
| Source Address | Source IP Address |
| Source Port | Source Port |
| Target Address | Destination IP Address |
| Target Port | Destination Port |

Apache HTTP Server 1.3 and above

| ArcSight Data Fields | Apache HTTP Server 1.3 and above Specific Event Definitions |
|---|---|
| Access Log File Agent: | |
| Agent Type | apache_access_file |
| Target Web Method | GET or POST |
| Target Web URL | URL |
| Error Log File Agent: | |
| Agent Type | apache_error_file |
| ArcSight Severity | Very-High (emerg, alert, crit), High (error), Medium (warn), Low (notice, info, debug) |

Check Point Firewall - 1 4.1 OPSEC

| ArcSight Data Fields | Check Point FireWall - 1 4.1 OPSEC Specific Event Definitions |
|---|---|
| Additional Data | Event Type (Type), Action, Rule (Rule Violated), Len (info) |
| Agent Type | checkpointfirewall_opsec |
| ArcSight Severity | High (Drop, Reject), Low (Accept) |
| Custom Number 2 | Bytes |
| Custom Number 3 | Elapsed |
| Custom String 2 | Interface Name |
| Custom String 3 | Interface Direction |
| Custom String 4 | Rule |
| Detect Time | Date and time when the event was detected by the device |
| Device Action | Action |
| Device Address | Check Point Firewall Address |
| Device Inbound Interface | Interface Name |
| Device Outbound Interface | Interface Name |
| Event Name | Name: "CP FW {Direction} Action: {ACTION} Service: {SERVICE} Rule: {RULE_#} (Log Type)"<br><br>If "inbound", {Direction} will equal "In" and "Out" for "outbound". The variables {ACTION}, {SERVICE}, and {RULE_#} are replaced with the actual values from the Check Point fields and (LogType) will be "Acct Log" or "Sec Log" for Account Log and Security Log respectively. |
| Protocol | Destination Protocol (Event Entry Protocol Field) |
| Service | Destination Port |
| Source Address | Source IP Address (Event Entry SRC Field) |
| Source Port | Source Port (Event Entry Port Field) |
| Target Address | Destination IP Address (Event Entry DST Field) |
| Target Hostname | Destination Node Name (Event Entry Interface Field) |
| Target Port | Destination Port (Event Entry Service Field) |

Check Point FireWall - 1 NG OPSEC

| ArcSight Data Fields | Check Point FireWall - 1 NG OPSEC Specific Event Definitions |
|---|---|
| Additional Data | Event Type (Type), Action, Rule (Rule Violated), Len (info) |
| Agent Severity | High (Drop, Reject), Low (Accept) |
| Custom Number 2 | Bytes |
| Custom Number 3 | Elapsed |
| Custom String 2 | Interface Name |
| Custom String 3 | Interface Direction |
| Custom String 4 | Rule |
| Detect Time | Date and Time |
| Device Action | Action |
| Device Inbound | Interface Name |
| Device Outbound | Interface Name |
| Device Severity | Action (Drop, Reject, Accept) |
| Event Name | "CP FW {Direction} Action: {ACTION} Service: {SERVICE} Rule: {RULE} |
| Protocol | Destination Protocol (Event Entry Protocol Fied) |
| Source Address | Source IP Address (Event Entry SRC Field) |
| Source Port | Source Port (Event Entry Port Field) |
| Target Address | Destination IP Address (Event Entry DST Field) |
| Target Hostname | Destination Node Name (Event Entry Interface Field) |
| Target Port | Destination Port (Event Entry Service Field) |

Aelita Event Manager (AEM) 6.0

| ArcSight Data Fields | Aelita Event Manager (AEM) 6.0 Specific Event Definitions |
|---|---|
| Additional Data | Event Category, Event Log - Type |
| Agent Type | aelita_db |
| Detect Time | Date & Time when Event was Detected by the NT System (Log Entry's Creation Time) |
| Event Name | Name: NT event description |
| Target Hostname | Computer Name Field |
| Target User ID | User Field |

Cisco Secure IDS 4210 2.x

| ArcSight Data Fields | Cisco Secure IDS 4210 2.x Specific Event Definitions |
|---|---|
| ArcSight Severity | Very-High (AlarmLevel > 5 - customer set severity), Very-High (AlarmLevel 5), High (AlarmLevel 4), Medium (AlarmLevel 3), Low (AlarmLevel 0, 1, and 2) |
| Custom Number 1 | ApplicationID |
| Custom Number 2 | HostID |
| Custom Number 3 | OrganizationID |
| Custom String 2 | SigID |
| Custom String 3 | SubSigID |
| Custom String 4 | MatchedContext |
| Custom String 5 | OtherContext |
| Detect Time | Event's Timestamp |
| Device Inbound Interface | SourceDirection |
| Device Ip Address | Configured Cisco IDS Ip Address |
| Device Outbound Interface | DestinationDirection |
| Device Severity | AlarmLevel |
| Event Name | Cisco IDS' AlarmDescription |
| Protocol | Protocol |
| Source Address | SourceIPAddress |
| Source Port | SourcePort |
| Target Address | DestinationIPAddress |
| Target Port | Destination Port |

Cisco Pix SNMP 5.x and above

| ArcSight Data Fields | Cisco Pix SNMP 5.x and above Specific Event Definitions |
|---|---|
| Additional Data | Trap Type, Trap Header, Error Message, Time Ticks |
| Agent Type | ciscopix_snmp |
| ArcSight Severity | Very High (0-1), High (2-3), Medium (4-5), Low (6-7) |
| Custom String 1 | Error Message |
| Detect Time | Date & Time When Event was Detected by the Device |
| Device Host Name | Cisco Secure Pix's Host Name (SNMP Trap Sender) |
| Device Severity | 7-0 |
| Event Name | Name: Pix Message |
| Protocol | Destination Protocol (Event Entry Protocol) |
| Source Address | Source IP Address (Event Entry Source IP Address) |
| Source Port | Source Port (Event Entry Source Port) |
| Target Address | Destination IP Address (Event Entry Destination IP Address) |
| Target Port | Destination Port (Event Entry Destination Port) |

Enterasys Dragon IDS 5.0

| ArcSight Data Fields | Enterasys Dragon IDS 5.0 Specific Event Definitions |
|---|---|
| Additional Data: DragonAlertName | name of the alert defined in the Dragon IDS configuration file |
| Additional Data: DragonDirection | To, From, Interior or Exterior |
| Additional Data: DragonSensor | name of the Dragon IDS sensor that generated the event |
| Agent Type | Dragon_file or dragon_snmp |
| ArcSight Severity | Low (<25), Medium (<50), High (<100), Very-High (>=100) |
| Device Host Name | If the relevant field in the logs appear as <name>-nids or <name>-hids, then <name> is used. Otherwise, the entire field is used. The former is the default behaviour unless Dragon is configured to use a custom name in that field. |
| Device Product | Dragon |
| Device Severity | 0-200 |
| Device Vendor | Enterasys |

Entercept 2.0

| ArcSight Data Fields | Entercept 2.0 Specific Event Definitions |
|---|---|
| Additional Data | AgentType |
| Additional Data | ApplicationName |
| Additional Data | Date_Time |
| Addition Data | Display Names (optional) |
| Additional Data | EventID |
| Additional Data | EventSource |
| Additional Data | IP |
| Additional Data | Workstation Name |
| Additional Data | Services (optional) |
| Agent Type | entercept_db |
| ArcSight Severity | Low if WarningMode is prevention mode, otherwise Very-High (High), High (Medium), Medium (Low), Low (Disabled, Info) |
| Custom Number 1 | WarningMode |
| Detect Time | Date & Time When Event was Detected by the Device (EventDate) |
| Device Action | Reaction Type Name |
| Device Address | IP |
| Device Host Name | Computer Name |
| Device Process Name | Application Name |
| Device Severity | Disabled, Info, Low, Medium, High |
| Event Name | Signature Name |
| File Name | Process Name (This field is optional: values may not be displayed due to the event.) |
| File Path | Process Path (This field is optional: values may not be displayed due to the event.) |
| Protocol | Protocol (optional) |
| Target Address | Destination IP Address |
| Target Domain | Destination Domain |
| Target Hostname | Destination Hostname |
| Target Port1 | Destination Port (optional) |
| Target User ID | User Name |

ICEcap Manager 3.0

| ArcSight Data Fields | ICEcap Manager 3.0 Specific Event Definitions |
|---|---|
| Additional Data: EndTime | IceEvents.EndTime |
| Additional Data: PacketFlags | IceEvents.PacketFlags |
| ArcSight Severity | Very-High (device severity 8-10), High (device severity 5-7), Medium (device severity 3-4), Low (device severity 0-2) |
| Device Location | IcecapAgent.IPAddress |
| Device Severity | IceEvents.IssueSeverity |
| Event Category | Issue.IssueClass |
| Event Detect Time | IceEvents.StartTime |
| Event Name | IceEvents.IssueName |
| Protocol | IceEvents.IPProtocol |
| Source Address | IceEvents.IntruderIP |
| Source Port | IceEvents.SourcePort |
| Target Address | IceEvents.TargetIP |
| Target Port | IceEvents.DestinationPort |

Microsoft Internet Information Server (IIS) 5.0

| ArcSight Data Fields | Microsoft Internet Information Server (IIS) 5.0 Specific Event Definitions |
|---|---|
| Additional Data | cs (User-Agent), time-taken, cs (Referer), cs (Cookie), sc-win32-status, cs-uri-query, sc-bytes, s-siteaname |
| ArcSight Severity | High (Device Severity 400 to 599), Medium (Device Severity 300 to 399), Low (Device Severity 100 to 299) |
| Device Location | The machine running IIS |
| Device Severity | sc-status |
| Event Create Time | The current timestamp when the Agent generates an event. |
| Event Detect Time | date+time |
| Event Name | IIS action |
| Protocol | cs-version |
| Source Address | c-ip |
| Source User ID | cs-username |
| Target Address | s-ip |
| Target Host Name | s-computername |
| Target Port | s-port |
| Target Web Method | cs-method |
| Target Web URL | cs-uri-stem |

SecureNet Pro 4.0

| ArcSight Data Fields | SecureNet Pro 4.0 Specific Event Definitions |
|---|---|
| Additional Data | SrcEther, DstEther, ID, orig ID, ModuleName, ModuleGroup |
| ArcSight Severity | Very High (Priority 1), Medium (Priority 2), Low (Priority 3) |
| Detect Time | Time Stamp |
| Device Severity | Priority 1, Priority 2, Priority 3 |
| Event Name | Message |
| Protocol | Input Type |
| Source Address | Source IP |
| Source Port | Source Port |
| Target Address | Destination IP |
| Target Port | Destination Port |

ISS InternetScanner Database Agent 6.21

| ArcSight Data Fields | ISS InternetScanner Database Agent 6.21 Specific Event Definitions |
|---|---|
| Device Address | scanHostIp |
| Device Host Name | scanHostDNSName |
| Detect Time | statusTime, stoptime (for services and users found) |
| Event Name | One of "Vulnerability Found:"+shortDesc, "Service Found:"+serviceName, "User Found:"+username, "Banner Found:"+bannerText |
| Service | shortdesc (for services found) |
| Target Port | ports (for services found) |
| Protocol | serviceType (for services found) bannerType (for banners found) |
| Device Severity | severity |
| Custom Severity | usrSeverity |
| Custom String 1 | vulnid (xforce id) |
| Custom String 2 | vulnName |
| Custom String 3 | bannerText (for banners found) |
| Custom String 5 | osName |
| Custom String 6 | osAffected |
| Custom Number 2 | status |
| ArcSight Category | __getVulnerabilityCategory(0); |
| Target Address | ipAddressStr |
| Target Host Name | DNSName |
| Target User ID | userName (for Users found) |
| Target Domain | NBDomain |
| Custom String 4 | jobDesc+"\|"_jobComment+"\|"+templateName+"\|"+templateVersion+"\|"+logFileName+"\|"+termStatus+"\|"+keyName |
| Custom Number 1 | jobID |
| ArcSight Severity | High (if severity = 3), Medium (if severity = 2), and Low (if severity = 1) |

ISS RealSecure Database 5.5

| ArcSight Data Fields | ISS RealSecure Database 5.5 Specific Event Definitions |
|---|---|
| Additional Data | DecodePairCount |
| Additional Data | DestinationEthernetAddr |
| Additional Data | DestinationEthernetVendor |
| Additional Data | EngineType |
| Additional Data | ICMPCode |
| Additional Data | ICMPType |
| Additional Data | KillActionSpecified |
| Additional Data | Pulled |
| Additional Data | RawData |
| Additional Data | RawDataLen |
| Additional Data | RSEventType<br><br>This is based on the RealSecure Protocol ID from either the Network Sensor Event or Engine Notification Event. |
| Additional Data | SourceEthernetAddr |
| Additional Data | SourceEthernetVendor |
| Additional Data | TCPFlags |
| Additional Data | TagName (One or More) |
| Additional Data | TagValue (One or More) |
| Agent Type | issrealsecure_db |
| ArcSight Severity | High (1), Medium (2), Low (3) |
| Create Time | Event Creation Time |
| Detect Time | EventDate |
| Event Name | EventName |
| Protocol | RealSecure Protocol ID (ICMP, IGMP, TCP, UDP, or ARP) |
| Service | DestinationPortName |
| Source Address | SourceAddress |
| Source Hostname | SourceAddressName |
| Source Port | SourcePort |
| Target Address | DestinationAddress |
| Target Hostname | DestinationAddressName |
| Target Port | DestinationPort |

ISS RealSecure Database 6.0

| ArcSight Data Fields | ISS RealSecure Database 6.0 Specific Event Definitions |
|---|---|
| Additional Data | DestEthernetAddr |
| Additional Data | DestEthernetVendor |
| Additional Data | ICMPCode |
| Additional Data | ICMPType |
| Additional Data | RawData |
| Additional Data | SrcEthernetAddr |
| Additional Data | SrcEthernetVendor |
| Additional Data | TCPFlags |
| Additional Data | Specific additional data event fields |
| Agent Type | issrealsecure_db |
| ArcSight Severity | High (1), Medium (2), Low (3) |
| Create Time | Event Creation Time |
| Custom String 1 | Response List |
| Detect Time | EventDate |
| Device Address | Sensor Address |
| Event Name | OrigEventName |
| Service | DestPortName |
| Source Address | SrcIPAddress |
| Source Port | SrcPort |
| Target Address | DestIPAddress |
| Target Port | DestPort |
|  |  |

ISS RealSecure SNMP 5.5 and 6.0

| ArcSight Data Fields | ISS RealSecure SNMP 5.5 and 6.0 Specific Event Definitions |
|---|---|
| Additional Data | User Action |
| Additional Data | ICMPCode |
| Additional Data | ICMPType |
| Additional Data | Specific Info |
| Additional Data | Time Ticks (Log Entry Time) |
| Additional Data | Event ID |
| Additional Data | Data |
| Additional Data | Agent Category (IDS) |
| Agent Type | issrealsecure_snmp |
| ArcSight Severity | High (1), Medium (2), Low (3) |
| Detect Time | Date & Time When Event was Detected by the Device (EventEntryTime) |
| Device Address | RealSecure Host Address (SNMP Trap Sender) |
| Device Host Name | RealSecure Host name (SNMP Trap Sender) |
| Device Severity | 1-3 (EventPriority) |
| Event Name | Name: EventName |
| Protocol | Destination Protocol (Event Entry Protocol) |
| Source Address | Source IP Address (Event Entry Source IP Address) |
| Source Host Name | Source Host Name (Event Entry Source Host Name) |
| Source Port | Source Port (Event Entry Source Port) |
| Target Hostname | Destination Host Name (Event Entry Destination Name) |
| Target Address | Destination IP Address (Event Entry Destination IP Address) |
| Target Port | Destination Port (Event Entry Destination Port) |

Lucent Brick MS 5.1

| ArcSight Data Fields | Lucent Brick MS 5.1 Specific Event Definitions |
|---|---|
| Additional Data | Trap Type, Trap Header, Error Message, Time Ticks |
| Agent Type | lucent_log_file |
| ArcSight Severity | Very High (1), Medium (2), Low (3) |
| Detect Time | Date & Time When Event was Detected by the Device |
| Device Inbound Interface | SNDINTF |
| Device Outbound Interface | RECINTF |
| Device Severity | 1-3 |
| Event Name | Name: Lucent Message |
| Protocol | Destination Protocol (PROTO) |
| Source Address | Source IP Address (SRCHOST) |
| Source Port | (Source Port (SRCPRT) |
| Source User Name | USERID/ADMINID |
| Target Address | Destination IP Address (DSTHOST) |
| Target Port | Destination Port (DSTPRT) |
| Target Web URL | URL |

Netegrity SiteMinder 4.6

| ArcSight Data Fields | Netegrity SiteMinder 4.6 Specific Event Definitions |
|---|---|
| Additional Data | nReason |
| Additional Data | nVersion |
| Additional Data | szAgentName |
| Additional Data | szAuthDirName |
| Additional Data | szAuthDirNamespace |
| Additional Data | szAuthDirServer |
| Additional Data | szDirName |
| Additional Data | szDomainOid |
| Additional Data | szFieldDesc |
| Additional Data | szMsg |
| Additional Data | szName |
| Additional Data | szOjbClass |
| Additional Data | SzObjOid |
| Additional Data | szObjPath |
| Additional Data | szOrgName |
| Additional Data | szRealmName |
| Additional Data | szRealmOid |
| Additional Data | szRoleName |
| Additional Data | szSessionId |
| Additional Data | szStatusMsg |
| Additional Data | szTransactionId |
| Agent Type | netegritysiteminder |
| ArcSight Severity | High (Reject/FailedLogin/InitFail/OpenFail/ConnectionFail/LoginFail), Low (all others) |
| Detect Time | Date and time when the event was detected by the device |
| Event Category | nCategoryType/nCategory |
| Event Name | Event Content |
| Source Host Name | szClientIp or szIpAddress |
| Source Port | nPort |
| Source User ID | szUserName |
| Target Host Name | szServer |
| Target Web Method | szAction |

| ArcSight Data Fields | Netegrity SiteMinder 4.6 Specific Event Definitions |
|---|---|
| Target Web URL | szResource |

NetScreen Firewall ScreenOS 3.0.2

| ArcSight Data Fields | NetScreen Firewall ScreenOS 3.0.2 Specific Event Definitions |
|---|---|
| Agent Type | syslog_pipe |
| ArcSight Severity | Very-High (emergency, alert, critical), High (error), Medium (warning), Low (information, notification) |
| Custom String 1 | message ID |
| Device Host Name | NetScreen's Host Name |
| Device Process Name | Module |
| Device Severity | Severity |
| Event Name | message |

Network Appliance NetCache NetApp 5.2

| ArcSight Data Fields | Network Appliance NetCache NetApp 5.2 Specific Event Definitions |
|---|---|
| ArcSight Severity | Low (Information and Notice), Medium (Warning), High (Error and Alert), Very-High (Critical and Emergency) |
| Detect Time and Detect Time Offset | x-localtime |
| Device Action | Derived from parse x-request-line, for example, GET |
| Event Name | x-request-line, for example, GET http://repo2.streamingedge.com. |
| Protocol | Derived from x-request-line, for example, HTTP/1.0 |
| Source Address | c-ip |
| Target Host Name | Derived from x-request-line |
| Target Web URL | Derived from x-request-line |

NFR CMS 2.0

| ArcSight Data Fields | NFR CMS 2.0 Specific Event Definitions |
|---|---|
| ArcSight Severity | Low (Informational), Medium (Warning), High (Error), Very-High (Attack) |
| Custom Number 1 | NFR Line |
| Custom String 1 | NFR Event ID |
| Custom String 2 | NFR Source ID |
| Device Host Name | NFR Host |
| Device Location | The machine running NFR CMS |
| Device Process Name | NFR Source Name |
| Device Severity | Informational, Warning, Error, Attack |
| Event Create Time | The current timestamp when agent generates an event. |
| Event Detect Time | Time field in NFR log. |
| Event Name | The event name, varies from event to event. |
| File Name | NFR Source File |

Oblix NetPoint 5.2

| ArcSight Data Fields | Oblix NetPoint 5.2 Specific Event Definitions |
|---|---|
| Additional Data | %ob_serverid%, %ob_wgid% |
| ArcSight Severity | Very-High (failed events) and Low (successful events) |
| Device Location | The machine running Oblix NetPoint 7.0 |
| Event Create Time | The current timestamp when the Agent generates the event. |
| Event Detect Time | %ob_date% + %ob_time_no_offset |
| Event Name | %ob_event% |
| Source User ID | %ob_userid% |
| Target Web Method | %ob_operation% |
| Target Web URL | %ob_url% |

Symantec Enterprise Firewall (Raptor) 7.0

| ArcSight Data Fields | Symantec Enterprise Firewall (Raptor) 7.0 Specific Event Definitions |
|---|---|
| ArcSight Severity | Low (Information and Notice), Medium (Warning), High (Error and Alert), Very-High (Critical and Emergency) |
| Device Location | The machine running Raptor 7.0 |
| Device Severity | Information, Notice, Warning, Error, Alert, Critical, Emergency |
| Event Create Time | The current timestamp when the Agent generates the event. |
| Event Detect Time | The first token in the log. |
| Event Name | The event name, varies from event to event. |

Snort Database 1.8.1

| ArcSight Data Fields | Snort Database 1.8.1 Specific Event Definitions |
|---|---|
| Additional Data | Cid |
| Additional Data | Sid |
| Additional Data | Snort Payload |
| Agent Type | snort_db |
| ArcSight Severity | Very-High (1), Medium (2), Low (3), Unknown (other) |
| Detect Time | Date & Time When Event was Detected by the Device (EventDate) |
| Device Severity | Snort Priority |
| Event Category | Snort Category |
| Event Name | Snort's Signature Name |
| Protocol | Protocol |
| Source Address | Source IP Address |
| Source Port | Source Port |
| Target Address | Destination IP Address |
| Target Port | Destination Port |

Snort Log-file 1.8.1

| ArcSight Data Fields | Snort Log-file 1.8.1 Specific Event Definitions |
|---|---|
| Additional Data | Cid |
| Additional Data | Sid |
| Additional Data | Snort Payload |
| Agent Type | snort_file |
| ArcSight Severity | Very-High (1), Medium (2), Low (3), Unknown (other) |
| Detect Time | Date & Time When Event was Detected by the Device (TimeStamp) |
| Device Severity | Snort Priority |
| Event Category | Snort Category |
| Event Name | Snort's Signature Name |
| Protocol | Protocol |
| Source Address | Source IP Address |
| Source Port | Source Port |
| Target Address | Destination IP Address |
| Target Port | Destination Port |

Sun Solaris

| ArcSight Data Fields | Sun Solaris Specific Event Definitions |
| --- | --- |
| Agent Type | syslog_pipe |
| Custom String 1 | Original Syslog Message String |
| Detect Time | Date & Time When Event was Detected by the Device |
| Event Time | Router Message |

Snort Log-file 1.8

| ArcSight Data Fields | Snort Log-file 1.8 Specific Definitions |
|---|---|
| ArcSight Severity | Very-High (Device Severity 1), Medium (Device Severity 2), Low (Device Severity 3) |
| Device Location | The machine running Snort IDS |
| Device Severity | 1, 2, 3 |
| Event Create Time | The current timestamp when the Agent generates an event. |
| Event Detect Time | The event generated time. |
| Event Name | The event name. Varies from event to event. |

Symantec Enterprise Security Manager 5.5

| ArcSight Data Fields | Symantec Enterprise Security Manager 5.5 Specific Event Definitions |
|---|---|
| Additional Data | ESMAgent.OSinfo |
| Additional Data | ESMJobRun.StartTime |
| Additional Data | ESMJobRunCheckResult.Information |
| Additional Data | ESMJobRunCheckResult.NameValue |
| Additional Data | ESMManager.ManagerName |
| Additional Data | EMSPolicyCheck.ModuleName |
| Additional Data | ESMDomain.DomainName |
| Additional Data | ESMMessage.FullText |
| Additional Data | ESMOSVer.Description |
| Additional Data | ESMPolicy.PolicyName |
| ArcSight Severity | High (2), Medium (1), Low (0) |
| Detect Time | ESMJobRun.FinishTime |
| Device Severity | ESMMessage.MsgLevel |
| Event Name | ESMMessage.Title |
| File Name | ESMPolicyCheck.ModuleShortName |
| Target Name | ESMAgent.AgentName |

Symantec Intruder Alert 3.6

| ArcSight Data Fields | Symantec Intruder Alert 3.6 Specific Event Definitions |
|---|---|
| Custom Number 1 | %policy_id% |
| Custom Number 2 | %rule_id% |
| Custom String 1 | %policy% |
| Custom String 2 | %policy_desc% |
| Custom String 3 | %text% |
| Custom String 4 | %rule_desc% |
| Detect Time | %e_century%, %e_year%, %e_month%, %e_monthday%, %e_hour%, %e_minute%, %e_second% |
| Device Location | %manager% |
| Device Severity | %severity% |
| Event Name | %rule% |
| Target Address | %agent_ip% |
| Target Hostname | %agent% |
| Target User ID | %user% |

Symantec ManHunt 2.1

| ArcSight Data Fields | Symantec ManHunt 2.1 Specific Event Definitions |
|---|---|
| Detect Time | CRTTIME for events, TIME for incidents |
| Source Address | SIPS (multiple events are created if more than one address is contained in this field) |
| Target Address | DIPS (multiple events are created if more than one address is contained in this field) |
| Protocol | PROT |
| Device Severity | SEVERITY |
| Device Host Name | NODENUM |
| Device Inbound Interface | IFNAME |
| Event Name | TYPE |
| Event Category | CLASS+"|"+FMLY |
| Custom String1 | IDENT |
| Custom String2 | CLUSTERID+"|"+NODENUM+"|"+INCIDENTID+"|"+EVENTNUM for Incidents CLUSTERID+"|"+NODENUM+"|"+INCIDENTID |
| Custom String3 | INCENTID |
| ArcSight Severity | Very-High (if SEVERITY = 0..63), High (if SEVERITY = 64..127), Medium (if SEVERITY = 128..191), and Low (if SEVERITY = 192..255) |
| Custom String4 | INCIDREFS (for Incidents) |

Tripwire Open Source 2.3.0

| ArcSight Data Fields | Tripwire Open Source 2.3.0 Specific Event Definitions |
|---|---|
| Additional Data | Observed GID |
| Additional Data | Observed File Device Number |
| Additional Data | Observed Num Links |
| Additional Data | Observed Device Number |
| Additional Data | Observed Inode Number |
| Additional Data | Observed Mode |
| Additional Data | Observed Size |
| Additional Data | Observed UID |
| Additional Data | Observed Blocks |
| Additional Data | Observed Object Type |
| Additional Data | Expected GID |
| Additional Data | Expected File Device Number |
| Additional Data | Expected Num Links |
| Additional Data | Expected Device Number |
| Additional Data | Expected Inode Number |
| Additional Data | Expected Mode |
| Additional Data | Expected Size |
| Additional Data | Expected UID |
| Additional Data | Expected Blocks |
| Additional Data | Expected Object Type |
| Agent Type | tripwire |
| ArcSight Severity | Very High (1000 or higher), High (100-999), Medium (66-99), Low (65-or lower) |
| Device Address | Source IP Address (saddr Field of Packet Element) |
| Device Hostname | Hostname of Machine Running Tripwire |
| Detect Time | Date & Time When Event was Detected by the Device (EventDate) |
| Device Severity | 100-1 |
| Event Name | Name: Tripwire's Signature Element |
| File Name | Name of the file the event is referring to |
| File Path | Pathname to where the file is located |

Unix Login/Logout Agent

| ArcSight Data Fields | Unix Login/Logout Agent Specific Event Definitions |
|---|---|
| Custom String 1 | the Line field in WTMP, It is used for matching login and logoff to the same session |
| Device Location | The machine running UNIX Login Agent |
| Event Detect Time | Timestamp in WTMP |
| Event Create Time | The current timestamp when the Agent generates an event |
| Event Name | login or logoff |
| Source Host Name | the machine that login/logoff |
| Target User ID | the login user ID |

APPENDIX C

In this example there is a log file called *sample_data.txt*, that contains the following information:

Jan 11 2000 13:15:01 linux12 sshd[3456]: Failed password for ROOT from 10.0.111.141 port 32790 ssh2

Jan 11 2000 12:15:01 linux12 sshd[3456]: Accepted password for GUEST from 10.0.23.33 port 32743 ssh2

In this sample file the messages are not really delimited, but you need to extract certain pieces of information out of it. For example, you need the timestamp of the event, the host where it occurred, the user ID, the source IP address, the source port and the process (sshd). In order to get this information you need to create a configuration file.

To create a configuration file for a Regex File Reader Agent:

Everything written within a configuration file (token types, event fields, and so forth) are case-sensitive.

1. Build a Perl script-like regular expression like the following:

(.*) ([^\ ] *) ([^\ ] *) (\d+\] : (.*) for (.*) password from (\d+.\d+.\d+.\d+) port (\d+) ssh2

In this example, the regular expression will tokenize each message into the following sub-groups:

- ❖ Jan 11 2000 13:15:01
- ❖ linux12
- ❖ sshd
- ❖ Failed
- ❖ ROOT
- ❖ 10.0.111.141
- ❖ 32790

This guide does not include detailed information on creating regular expressions. If you are unfamiliar with regular expressions or Perl script you may need to look to other sources. Many sources of regular expression information can be found via the Internet.

2. Specify the number of tokens that each line of the file contains. In this example, you would set this to 7 since there are 7 tokens in each line of the file:

token.count = 7

3. Specify the meaning and format of each token within the file. You must define the property token followed by the index of the token enclosed by brackets and a property, there are 3 basic properties that each token can have:

| Property | Description |
| --- | --- |
| token[x].name | This property specifies a user-defined name for the token, this can be a friendly name used to identify the token, for example token [0].name=Time_of_the_event this would set the name of the token of index 0 to Time_of_the_event. We will use this friendly name to identify how to map it to the event object later. The token[x] always begins with 0 and goes up to N-1, where Token.count = N. |
| token[x].type | This property specifies the data types of the object, it is important to set the correct type so the mapping to the event object can be correctly performed. Currently these are the types supported:<br>♦ token[0].type=TimeStamp, A date and time<br>♦ token[0].type=IPAddress, An IP address<br>♦ token[0].type=String, Any string<br>♦ token[0].type=Integer, A number<br>♦ token[0].type=Long, A number<br>The token[x] always begins with 0 and goes up to N-1, where Token.count=N. |
| token[x].format | This property only applies if using the TimeStamp type, as it defines the format of the time stamp.<br>The token[x] always begins with 0 and goes up to N-1, where Token.count=N. |

To specify the TimeStamp format in the token[x] format property, you can use any of the following time pattern strings:

| Symbol | Meaning | Presentation | Example |
| --- | --- | --- | --- |
| G | era designator | (Text) | AD |
| y | year | (Number) | 1996 |
| M | Month in year | (Text & Number) | July & 07 |

| Symbol | Meaning | Presentation | Example |
|---|---|---|---|
| D | day in month | (Number) | 10 |
| h | hour in am/pm (1~12) | (Number) | 12 |
| H | hour in day (0~23) | (Number) | 0 |
| m | minute in hour | (Number) | 30 |
| s | second in minute | (Number) | 55 |
| S | millisecond | (Number) | 978 |
| E | day in week | (Text) | Tuesday |
| D | day in year | (Number) | 129 |
| F | day of week in month | (Number) | 2 (2nd Wed. in July) |
| w | week in year | (Number) | 27 |
| W | week in month | (Number) | 2 |
| a | am/pm marker | (Text) | PM |
| k | hour in day (1~24) | (Number) | 24 |
| K | hour in am/pm (0~11) | (Number) | 0 |
| z | time zone | (Text) | Pacific Standard Time |
| ' | escape for text | (Delimiter) | |
| " | single quote | (Literal) | |

In this example, the format would be:

MM dd yyy HH : mm : ss

So, the format of the tokens in this example would be:

```
token[0].name=Date_and_time
token[0].type=TimeStamp
token[0].format=MM dd yyy HH : mm : ss
token[1].name=HostName
token[2].type=String
token[2].type=Process
token[3].name=Message
token[3].type=String
token[4].name=UserID
token[4].type=String
token[5].name=SourceIp
token[5].type=IPAddress
token[6].name=SourcePort
token[6].type=Integer
```

4. After you have defined the tokens, map each token to the event object using the following format:

event.<eventField>=<tokenName>

The possible event field mapping files and their associated token types are:

| Mapping | Type |
|---|---|
| event.eventName | String |
| event.protocol | String |
| event.deviceAction | String |
| event.deviceAddress | IP address |
| event.deviceHostName | String |
| event.deviceSeverity | String |
| event.sourceHostName | String |
| event.sourceAddress | IP address |
| event.targetHostName | String |
| event.targetAddress | IP address |
| event.targetWebURL | String |
| event.targetWebMethod | String |
| event.customString1 | String |
| event.customString2 | String |
| event.customString3 | String |
| event.customString4 | String |
| event.customNumber1 | Long |
| event.customNumber2 | Long |
| event.customNumber3 | Long |

The event field must match the token type. For example, event.sourceAddress=URL would not be valid mapping since event.sourceAddress must be an IP address not a String.

In this example, the mapping would be defined as follows:

event.detectTime=Date_and_time
event.eventName=Message
event.deviceSeverity=Message
event.deviceHostName=HostName
event.deviceProcessName=Process
event.sourceUserID=UserID
event.sourceAddress=SourceIp
event.sourcePort=SourcePort 5. Define how the device severity needs to map to the ArcSight Severity, this is done by adding severity mapping properties. This step is optional. The severity mapping properties are defined as follows:

| ArcSight | Property |
|---|---|
| Very High | severity.map.veryhigh.if.deviceSeverity |
| High | severity.map.high.if.deviceSeverity |
| Medium | severity.map.medium.if.deviceSeverity |
| Low | severity.map.low.if.deviceSeverity |

These properties cause the ArcSight Severity to be set to a specific level if the Device Severity is one of the values specified. For example:

severity.map.veryhigh.if.deviceSeverity=Failed

This would cause a Very High severity event when the status of the request was Failed.

severity.map.low.if.deviceSeverity=Accepted

This would cause a Low severity event when the status of the request was Accepted. Now the complete configuration file for this example will look like the following:

```
regex= (.*) ([^\\ ]*) ([^\\ ]*)\\[d+\\] : (.*) password for (.*) from
(\\d+.\\d+.\\d+.\\d+) port (\\d+) ssh2 token.count=7
token[0].name=Date_and_time
token[0].type=TimeStamp
token[0].format=MMM dd yyy HH : mm : ss
token[1].name=HostName
token[1].type=String
token[2].name=Process
token[2].type=String
token[3].name=Message
token[3].type=String
token[4].name=UserID
token[4].type=String
token[5].name=SourceIp
token[5].type=IPAddress
token[6].name=SourcePort
token[6].type=Integer
``` event.detectTime=Date_and_time
event.eventName=Message
event.deviceSeverity=Message
event.deviceHostName=HostName
event.deviceProcessName=Process
event.eventsourceUserId=UserId
event.sourceAddress=SourceIp
event.sourcePort=SourcePort severity.map.veryhigh.if.deviceSeverity=Failed
severity.map.low.if.deviceSeverity=Accepted.

The invention claimed is:

1. A method, comprising:
receiving security events from a network device by a distributed software agent of a network security system;
determining a first priority of each received security event, the first priority relating to an importance of the event;
storing the security events in a plurality of prioritized event buffers based on the determined first priorities for a period of time determined by a timer; and
upon expiration of the timer:
determining a batching priority for ones of the stored security events in accordance with both their first priority and with how long they have been waiting to be sent, and
creating a batch of security events for transport to a security event manager of the network security system by including security events in the batch in order of the batching priority until the batch is full, where a batch of security events has at most a predetermined number of security events and the predetermined number can be more than the number of stored security events waiting to be sent.

2. The method of claim 1, wherein the security events conform to a normalized security event schema.

3. The method of claim 2, wherein the normalized security event schema includes a priority field, and determining the first priority of each received security event comprises scanning information contained in the priority field of each security event.

4. The method of claim 3, wherein scanning for high priority security events is based on a normalized priority scale of the normalized security event schema, and the plurality of prioritized event buffers correspond to the priority scale.

5. The method of claim 4, wherein the priority scale of the normalized security event schema includes a very-high priority, a high priority, a medium priority, a low priority, or an unknown priority, and the plurality of prioritized event buffers comprise five event buffers, each corresponding to one priority of the priority scale.

6. The method of claim 1, wherein the security event manager resides on a machine linked by a communications medium to a machine on which the agent resides.

7. The method of claim 6, further comprising sending the batched security events over the communications medium using a transport protocol request.

8. A distributed software agent, stored in a memory of a data processing system and executed by a processor of the data processing system, comprising:
a channel access component configured to receive security events from a network device monitored by the agent; and
an agent batch component comprising:
a priority scanner configured to determine a first priority of each received security event;
a plurality of prioritized event buffers for storing the security events;
a timer configured to store the received security events in the plurality of prioritized event buffers according to the first priority of each security event as determined by the priority scanner until the timer expires; and
means for creating a batch of security events for transport to a security event manager of a network security system by including security events in the batch in order of a batching priority, the batching priority of an event based on both the event's first priority and with how long the event has been waiting to be sent, until the batch is full, where a batch of security events has at most a predetermined number of security events and the predetermined number can be more than the number of stored security events waiting to be sent.

9. The agent of claim 8, wherein the security events conform to a normalized security event schema used by the network security system.

10. The agent of claim 9, wherein the normalized security event schema includes a priority field, and the priority scanner determines the first priority of each received security event by scanning information contained in the priority field of each security event.

11. The agent of claim 10, wherein scanning for high priority security events is based on a normalized priority scale of the normalized security event schema, and the plurality of prioritized event buffers correspond to the priority scale.

12. The agent of claim 11, wherein the priority scale of the normalized security event schema includes a very-high priority, a high priority, a medium priority, a low priority, or an unknown priority, and the plurality of prioritized event buffers comprise five event buffers, each corresponding to one priority of the priority scale.

13. A machine-readable medium containing data representing instructions that, when executed by a processor, cause the processor to perform operations comprising:
receiving security events from a network device by a distributed software agent of a network security system;
determining a priority of each received security event;
storing the security events in a plurality of prioritized event buffers based on the determined priorities for a period of time determined by a timer; and
upon expiration of the timer:
determining a batching priority for ones of the stored security events in accordance with both their first priority and with how long they have been waiting to be sent, and
creating a batch of security events for transport to a security event manager of the network security system by including security events in the batch in order of the batching priority until the batch is full, where a batch of security events has at most a predetermined number of security events and the predetermined number can be more than the number of stored security events waiting to be sent.

14. The machine-readable medium of claim 13, wherein the security events conform to a normalized security event schema.

15. The machine-readable medium of claim 14, wherein the normalized security event schema includes a priority field, and determining the first priority of each received security event comprises scanning information contained in the priority field of each security event.

16. The machine-readable medium of claim 15, wherein scanning for high priority security events is based on a normalized priority scale of the normalized security event schema, and the plurality of prioritized event buffers correspond to the priority scale.

17. The machine-readable medium of claim 16, wherein the priority scale of the normalized security event schema includes a very-high priority, a high priority, a medium priority, a low priority, or an unknown priority, and the plurality of prioritized event buffers comprise five event buffers, each corresponding to one priority of the priority scale.

18. The machine-readable medium of claim 14, wherein the security event manager resides on a machine linked by a communications medium to a machine on which the agent resides.

19. The machine-readable medium of claim 18, wherein the instructions further cause the processor to send the batched security events over the communications medium using a transport protocol request.

20. A method comprising:
  receiving security events from a network device by a distributed software agent of a network security system;
  storing, in one or more event buffers, a number of received security events having a first priority related to the event's importance; and
  upon storing the number of security events in the one or more event buffers, batching the security events stored in the one or more event buffers, in accordance with a batching priority of the security events that is determined in accordance with both a first priority of the security events and with how long the security events have been waiting to be sent, for transport to a security event manager of the network security system, where a batch of security events has at most a predetermined number of security events and the predetermined number can be more than the number of stored security events waiting to be sent.

21. The method of claim 20, further comprising sending the batched security events to the security event manager.

22. The method of claim 21, wherein sending the batched security events comprises making a transfer protocol request.

23. The method of claim 21, wherein sending the batched security events comprises sending an http request.

24. A machine-readable medium containing data representing instructions that, when executed by a processor, cause the processor to perform operations comprising:
  receiving security events from a network device by a distributed software agent of a network security system;
  storing, in one or more event buffers, a number of received security events; and
  upon storing the number of security event in the one or more event buffers, batching the security events stored in the one or more event buffers, in accordance with a batching priority of the security events that is determined in accordance with both a first priority of the security events and with how long the security events have been waiting to be sent, for transport to a security event manager of the network security system, where a batch of security events has at most a predetermined number of security events and the predetermined number can be more than the number of stored security events waiting to be sent.

25. The machine-readable medium of claim 24, further comprising sending the batched security events to the security event manager.

26. The machine-readable medium of claim 25, wherein sending the batched security events comprises making a transfer protocol request.

27. The machine-readable medium of claim 25, wherein sending the batched security events comprises sending an http request.

* * * * *